United States Patent [15] 3,689,885
Kaplan et al. [45] Sept. 5, 1972

[54] INDUCTIVELY COUPLED PASSIVE RESPONDER AND INTERROGATOR UNIT HAVING MULTIDIMENSION ELECTROMAGNETIC FIELD CAPABILITIES

[72] Inventors: Leon M. Kaplan; Thomas A. Kriofsky, both of Goleta, Calif.

[73] Assignee: Transitag Corporation,

[22] Filed: Sept. 15, 1970

[21] Appl. No.: 72,483

[52] U.S. Cl. ....................340/152 T, 325/15, 343/6.8
[51] Int. Cl. ..............................................H04q 7/00
[58] Field of Search ......340/149, 152; 325/8, 15, 51; 343/6.5, 6.8

[56] References Cited

UNITED STATES PATENTS

| | | | |
|---|---|---|---|
| 3,018,475 | 1/1962 | Kleist et al. | 343/6.5 |
| 3,088,106 | 4/1963 | Smith | 343/6.5 |
| 3,384,892 | 5/1968 | Postman | 343/6.5 |

*Primary Examiner*—Donald J. Yusko
*Attorney*—Finkelstein & Mueth

[57] ABSTRACT

An interrogator-responder system wherein the responder is a passive responder receiving an inductively coupled electromagnetic power field from an interrogator unit and generating an unique predetermined electromagnetic coded information field in response to the presence of the electromagnetic power field. The interrogator unit has multidimensional recognition capabilities for detecting the electromagnetic coded information field independent of the orientation of the responder for two dimensional or three dimensional capabilities.

40 Claims, 11 Drawing Figures

INVENTORS
LEON M. KAPLAN
THOMAS A. KRIOFSKY
BY
Finkelstein & Mueth
ATTORNEYS

INVENTORS
LEON M. KAPLAN
THOMAS A. KRIOFSKY
BY
Finkelstein & Mueth
ATTORNEYS

INVENTORS
LEON M. KAPLAN
THOMAS A. KRIOFSKY
BY Finkelstein & Mueth
ATTORNEYS

INVENTORS
LEON M. KAPLAN
THOMAS A. KRIOFSKY
BY Finkelstein & Mueth
ATTORNEYS

INVENTORS
LEON M. KAPLAN
THOMAS A. KRIOFSKY
BY Finkelstein & Mueth
ATTORNEYS

INVENTORS
LEON M. KAPLAN
THOMAS A. KRIOFSKY
BY
Finkelstein & Mueth
ATTORNEYS

INVENTORS
LEON M. KAPLAN
THOMAS A. KRIOFSKY
BY
Finkelstein & Mueth
ATTORNEYS

INVENTORS
LEON M. KAPLAN
THOMAS A. KRIOFSKY
BY
Finkelstein & Mueth
ATTORNEYS

INDUCTIVELY COUPLED PASSIVE RESPONDER AND INTERROGATOR UNIT HAVING MULTIDIMENSION ELECTROMAGNETIC FIELD CAPABILITIES

BACKGROUND OF THE INVENTION 1. Field of the Invention

This invention relates to the identification art and more particularly to an improved interrogator-passive responder arrangement for providing an unique identification of a moving or stationary object in response to an inductively coupled signal from the interrogator.

2. Description of the Prior Art

A number of systems have been proposed in the past, and some have been utilized, for remote detection of an unique identification code on a responder that is placed upon a moving object. In such application the code detection generally comprises an interrogator means that is positioned in signal exchange relationship to the responder. One application of such a system is, the identification of individual cars of a freight train, individual buses on city streets, or the like. In such applications, though, there is generally provided a fixed and known relationship between the coded identification on the moving object or there is generally a predetermined motion of the moving object at a known speed in a fixed direction. Thus, these systems have generally comprised "single dimension" identification arrangements in that the interrogator was oriented to detect the data in a fixed path as the moving object passed the interrogator. Since the movement of freight cars, buses or the like are generally in a single dimension with respect to the interrogator, there is no requirement to provide multidimension detection capability.

Most interrogator-responder identification systems known heretofore are designed such that the interrogation and the response are either both in the form of radiated high frequency energy or such that the interrogation is in the form of low frequency (non-radiated) energy and that the response is in the form of high frequency radiated energy. Disadvantages to such systems include:

1. generation of rf interference in the environment;

2. complexity due to the requirement to maintain the output frequency within an assigned portion of the radio-frequency spectrum;

3. physical length of the responder radiating element is relatively large thereby limiting the minimum size of the responder. The identification system described herein operates in an entirely non-radiating mode thereby avoiding radio frequency interference problems.

Methods in the prior art used for generating specific code characteristics have usually involved frequency coding wherein the binary value of the code is established by the occurrence or non-occurrence of specified frequencies. For example, modulation of a carrier is accomplished by means of selected lower frequency signals, selected higher harmonic frequencies of the carrier or selective suppression from the carrier of predetermined frequencies.

Aside from radio frequency interference considerations, disadvantages to such systems include:

1. responder complexity due to the requirement for a relatively large number of tuned circuits or filter elements to achieve a large number of unique identification codes;

2. interrogator complexity due the requirement to generate and selectively sense a large number of frequencies;

3. responder tuned circuit bandwidth control problems if inductors are used in the tuning circuit due to detuning in the presence of ferromagnetic background materials.

In several cases of the prior art methods are suggested for generating unique time code sequences but as far as is known such patents have not shown how the required energy for the logic and switching circuitry is derived except by means of a responder battery. Time coding offers advantages over frequency coding in that a very large number of unique codes may be obtained with less complexity than with a frequency coded system. That is, as the number of required information bits becomes larger the time code approach becomes increasingly advantageous.

In certain prior art devices, there was utilized the fundamental technique of modulating the interrogator frequency by varying the impedance in a responder tuned circuit which is inductively coupled to the interrogator signal source.

In the system described herein, the responder uses the energy in the field provided by the interrogator to both generate a new non-radiated carrier and to time code modulate this carrier. Furthermore, in one embodiment of the system described herein the periodicity of the interrogator field is used to establish the code information rate.

Certain prior art devices also require the "ideal" orientation of the interrogator source field with the responder coil element, and do not operate in other orientations.

There are other interrogator-responder systems in the prior art, such as some shown in "Twenty-one Ways to Pick Data Off Moving Objects," Robert J. Barber, Control Engineering, Oct. 1965 and Jan. 1964, that use inductive or transformer coupling to derive power for the responder circuitry. However, as far as is known, only the "ideal" one dimensional case has been considered, i.e., these devices show a preferred relationship necessary for successful operation between the interrogator power output coil and responder pickup coil such that these coils are oriented with the coil axes parallel to one another. In such cases, often the responder uses the power to modulate a radio frequency carrier, i.e., it is a radiating system.

It will be appreciated that in certain applications requiring the detection of an unique coded signal associated with a moving object, the apparatus for generating the coded signal must be comparatively inexpensive, preferably passive to minimize cost, weight and size, and require comparatively low power for operation to minimize the transmitted power between the interrogator and the responder. Where very large scale mass production is anticipated, the responder must, of course, be capable of being mass produced at low cost, have a large number or code identification capacity.

There are those applications in which the orientation of the responder with respect to the interrogator will be completely random and will vary from responder to responder thus, three dimensional detection capability must be provided. Further, other applications often require at least two dimensional detection capability. That is, while the responder may have a known orientation in one dimension with respect to the interrogator, it may be unknown in orientation in the other two dimensions.

For example, in many industrial plants it is often desirable to know the precise location of guards, watchmen, executives or the like. Accordingly, a small inexpensive non-radiative passive responder could be carried by such people and each responder would be precoded to generate a known unique identification signal in response to the coupling of power into the responder. Interrogators could be positioned at various locations throughout the plant for continuously generating power fields for inductive coupling into the responder. As the personnel carrying the responder tags pass successive interrogators, their detected signals would be recorded and an appropriate visual display and/or computer entry could be made to show the precise location of the person. In such arrangements, of course, the responder tag may be in any orientation with respect to a given interrogator at the time the person passes by the interrogator.

Another application in which orientation of the responder with respect to the interrogator will be completely random is in the handling of luggage and cargo in airport terminals, freight terminals or the like. In this application, the entire system comprising the loading and unloading of the luggage must be considered and the identification of a particular piece of luggage forms an integral part of such a system. It will be appreciated that for such a system three dimensional reading capability is preferred and the responder tags which may be placed upon the luggage or cargo should be comparatively inexpensive, passive, non-radiative and have a sufficient code capacity for any desired number of information bits.

SUMMARY OF THE INVENTION

Accordingly, it is a primary object of the invention herein to provide an improved interrogator-responder arrangement for detecting an unique coded signal on a moving or stationary structure.

It is another object of the invention herein to provide an improved passive responder tag for generating an unique coded signal in response to an inductively coupled power signal applied thereto.

It is yet another object of applicant's invention herein to provide an improved interrogator for generating a power field within inductive coupling range of an appropriate passive responder and for receiving an unique coded identification field in response thereto and providing an output signal having an information content corresponding to the unique coded signal in the responder.

It is another objective of this invention to provide an interrogator-responder identification system wherein the responder derives all of the energy to power its timing, logic, coding and output circuitry from the interrogator.

It is a further object of this invention to provide an interrogator-responder identification system arrangement in which the capability exists to couple power and reliably transfer the responder code to the interrogator without regard to the phase inversion or the orientation of the power field receiving and coded information field generating coils of the responder with respect to the power field generating and coded information field receiving coils of the interrogator.

It is a further object of this invention to provide an interrogator-responder identification system in which the identification code of the responder is established by modulating a low frequency non-radiating carrier generated on the responder.

It is a further object of this invention to provide an interrogator-responder identification system in which the time information (periodicity) of the interrogator carrier is used to establish the modulation pulse rate on the responder carrier thereby avoiding the requirement for a separate time base generator on the responder for this purpose.

It is a further object of this invention to provide an interrogator-responder identification system in which the means of modulating the responder carrier provides the capability to reliably recognize each information bit time for the purpose of clocking the demodulated responder coded information signal in the interrogator, thereby avoiding ambiguity in the code recognition due the unknown orientation of the responder with respect to the interrogator.

It is a further object of this invention to provide an interrogator-responder identification system with a responder capability for generating a very large number of unique code combinations in a small size and form amenable to mass production.

As noted above, there are many applications wherein it is desired to have a full three dimensional detection capability between the responder and the interrogator. According to the principals of the invention herein, the invention is described as utilized in an automatic luggage handling system incorporating, as part of the system, the improved interrogator and responder according to the principals hereof.

However, for a better understanding of the operation of the invention the following description of an overall automatic luggage handling system incorporating the improved interrogator-responder arrangement of this invention is provided. In such an automatic luggage handling system a responder tag, having certain characteristics as described below, is attached to each individual piece of luggage at the check-in station or at the ticket collection station such as at an airport terminal. This tag may be affixed in any desired manner on the luggage and may, for convenience, be just generally attached to a handle to eliminate the necessity for a predetermined orientation. Since each tag has a unique code generation capability, the presence of the responder tag on the piece of luggage provides the capability for automatically identifying the luggage at any point along the route. The code on the tag may, if desired, indicate any desired information bit concerning the passenger, the flight, the ultimate destination, the routing, the number of pieces of luggage for this passenger, or the like. This is merely a design selection criteria. Alternatively, while each tag may have an unique code generating capability, the tags may be completely reusable and the particular code on each tag would then correspond to the recorded information on the passenger as indicated above. That is, the tag would not be changed for each passenger but merely the information associated with a passenger would correspond to a particular tag code. In one proposed arrangement for utilizing an automatic luggage handling system incorporating the improved interrogator tag, at the time of placing the tag on the luggage a second responder tag having a code generation capability that provides either the same code as the one affixed to the luggage or bears a known correspondence to the one attached to the luggage is given to the passenger. (For example, odd numbered tags may be utilized on the luggage and the next highest even number for each tag given to the passenger.)

The luggage is carried then in the conventional manner and upon arrival at its destination the passenger obtains his individual piece of luggage by utilizing the responder tag in his possession. Inserting that into the baggage request station automatic handling equipment is provided to detect the particular code on the tag, find the particular piece of luggage having the code thereon corresponding to the passengers tag and moving that piece of luggage to the awaiting passenger. On receipt of the luggage the passenger may then be allowed to remove the luggage from the area by placing both tags into a return comparator slot and, if the correct correspondence between tags is present, the gate opens allowing the passenger to leave and the tags are retained, stacked and returned to, for example, the airline for re-utilization.

It will be appreciated that in addition to the interrogator for detecting the coded signal on the tags, and the responder tags, there are many other major components of such an automatic baggage handling system. These would comprise, of course, conveyor belts, luggage transfer units, check-in stations, luggage sorting stations, luggage request stations, checkout stations and a digital communication cable.

Any combination of the above-mentioned additional components may be performed manually, if desired, and still allow utilization for a more efficient luggage identification and removal by the passenger. The above-mentioned systems are merely indicated as functional necessities and they may be combined or eliminated as economically practical or as limited by other factors.

The present invention, of course, is concerned with the interrogator and the responder tags. In such an application, one embodiment of the present invention may incorporate an interrogator means for generating an electromagnetic power field at frequency $f1$ within inductive coupling range of the responder tag, and, in turn, receiving the electromagnetic coded information field at frequency $f2$ generated by the responder tag and then providing an output signal having an information content corresponding to the electromagnetic coded information field received. The interrogator may comprise a power supply means for generating a controlled source of electrical energy and a power signal generator means that receives the controlled source of electric energy and generates a power signal in response thereto. The power signal generator means is coupled to an electromagnetic power field generator which is utilized to provide the electromagnetic power field to be coupled from the interrogator to the responder tag. In this application of the invention the interrogator and responder tag are inductively coupled to each other for the transmission of the electromagnetic power field from the interrogator to the responder tag and for the transmission of the electromagnetic coded information field from the responder tag back to the interrogator means.

The interrogator means also has a coded information field receiver means and, in one embodiment of the invention, the power field generator means and the coded information field receiver means of the interrogator means comprise a plurality of three induction coils arranged in an orthogonal relationship and may further comprise a switching means for sequentially switching each of the coils from a power generating condition to an information signal receiving condition at a predetermined switching frequency rate. One embodiment of the invention has one of the coils in the transmitting condition and two of the coils in the receiving condition and the coils are sequentially switched in a predetermined sequence.

The interrogator also is provided with a coded information signal detection means that detects the coded information signal received by the coded information field receiver, and a logic means that receives the detected coded information signal. The logic means incorporates structure for detecting a keying or synchronization portion of the coded information signal as well as the unique portion of the information signal. The logic means then generates an output signal having an information content corresponding to the unique portion of the information signal. The output signal may then be utilized in any storage or display or communications means as desired.

A time-base signal generator means is provided in the interrogator and is applied to both the power signal generator and the logic means for appropriate time-base synchronization.

A responder tag means is preferably a comparatively small tag and may, for example, be on the order of 2×3×/32 inches. In order to minimize complexity and allow incorporation of the tag into this small size, wherein it is preferably imbeded, it is preferred that integrated circuit techniques be utilized in order to minimize such size. Further, in order to minimize the cost in fabricating such tags on a large scale basis, it is preferred that a monolithic integrated circuit be utilized to implement as many facets of the responder tag as practical.

The responder tag is provided with an electromagnetic power field receiver means that receives the electromagnetic power field at frequency f1 from the interrogator and provides a DC responder tag power signal in response thereto. The receiver means on the responder tag may, in this embodiment, comprise a coil with a high permeability core means to maximize magnetic flux capture and having means for full wave rectification and filtering which may comprise a diode bridge. Since inductive coupling is provided between the interrogator and the responder, the signal strength varies with physical separation between the responder and interrogator. Accordingly, a DC voltage magnitude limiting means, which may be a zener diode, is incorporated in the field receiver means so that the DC power signal does not exceed a predetermined magnitude. The electromagnetic power field receiver means also provides, in this embodiment, an AC signal at frequency $f_1$ which may provide a stimulus input to the carrier time-base signal generating means and the code signal generating means to be subsequently described.

The responder also has a carrier time-base signal generating means that receives the DC responder tag power signal and generates a carrier time-base signal at frequency $f_2$ to the DC tag power applied to the carrier time-base signal generator means. It has been found that by having the carrier time-base signal at a comparatively high frequency such as, for example $f_2$=450 kiloHertz, and the electromagnetic power field at a lower frequency, for example, $f_1$=50 kiloHertz, interference between the electromagnetic coded information field and the electromagnetic field is minimized. The carrier time-base signal may be generated by utilizing a higher harmonic of the electromagnetic power field frequency $f_1$ or by utilizing a self container oscillator operating at frequency $f_2$.

The responder tag also has a code signal generator that receives the DC responder tag power signal and repetively generates an unique code signal. Utilization of metal oxide semiconductors, complimentary metal oxide semiconductors, silicon on sapphire semiconductor or other semiconductor arrays that provide high density transistor and/or diode configurations and require relatively low operating power are preferably incorporated as a portion of the code signal generator. These arrays are, of course, pre-encoded on assembly so that they repetitively generate the unique code in response to the presence of the DC responder tag power signal.

The code signal may be generated directly by utilizing the periodicity of the electromagnetic power field at frequency $f_1$ or harmonics or by utilizing a self-contained oscillator operating at frequency $f_3$, where $f_3$ is significantly less than $f_2$ and may equal $f_1$.

In one embodiment the information content of the code signal is presented in binary code decimal form. In the binary coded decimal, four bits represent the binary number. It has been found that one binary bit notation 0111111, together with one bit for parity identification does not represent a number sequence in this binary coded decimal format. Therefore, in this format these eight bits can be utilized as a synchronizing or keying portion of the information signal. That is, as the code signal generator repetitively generates the code a first portion of the information bits in the codes comprises the above-mentioned synchronizing or keying portion which may be common to all the responder tags and then the remainder of the binary bits in the information code comprise the unique binary code identification number for that particular responder tag.

The unique identification code generated by the code signal generator in this embodiment is applied to a coded information signal generator as is the carrier time-base signal. The coded information signal generator then modulates the carrier time-base signal with the code signal to provide the coded information signal that is coupled into an electromagnetic coded information field generator means which may comprise an induction coil from which it is inductively coupled back to the electromagnetic coded information field receiver of the interrogator means. Thus, as long as the power input field is present at the power field receiver of the responder tags, there will be a repetitive generation of the coded information field for inductive coupling back to the interrogator.

The logic in the interrogator has appropriate means for detecting the synchronizing or keying portion of the information signal and providing the output signal corresponding to the unique information code.

When the responder tag is affixed to an item without respect to orientation, such as a piece of luggage as mentioned above, the item passes through the three orthogonal coils of the electromagnetic power field generator and coded information field receiver in the interrogator. Thus the interrogator is in a fixed location and the coils are sufficiently enlarged enough to allow the item to pass through. While the item is within the coils the interrogator is continuously generating the power field within inductive coupling range of the responder tag and, as noted above, the responder tag is continuously generating the unique coded information field therefrom. Since the three orthogonal coils are sequentially switched from the signal transmitting to the signal receiving condition, and back, the orientation of the responder tag with respect to the three orthogonal coils is immaterial and the coded information field will thus be sensed for any three dimensional orientation of the responder tag.

In other embodiments of the invention the power field generator of the interrogator comprises a pair of compressed interrogator coils that are utilized for generation and projection only and a separate coil orthogonal to the interrogator coils is utilized as the coded information field receiver. Such a unit, when the long axes of the interrogator coils are mutually perpendicular, can provide both two dimensional information signal detection capability as well as a certain degree of angularly limited three dimensional detection capability.

In yet another embodiment of the invention the power field generator comprises a single compressed interrogator coil that is utilized for generation and projection only and a separate coil orthogonal to the interrogator coil is utilized as the coded information field receiver. Such a unit can provide both one dimensional information signal detection capability as well as a certain degree of angularly limited two and three dimensional detection capability.

In yet another embodiment of the invention the power signal generator and electromagnetic power field generator of the interrogator and the power field receiver of the responder may be replaced by an active power source within or coupled electrically to the responder. Such a unit can provide a simplification of the identification process such that the forementioned interrogator becomes merely a receiver in applications where a power source is available on the item to be identified, such as a vehicle, or an increased physical size of the responder can be tolerated.

BRIEF DESCRIPTION OF THE DRAWINGS

The above and other embodiments of the invention are more fully understood from the following detailed description taken together with the accompanying drawings wherein similar reference characters refer to similar elements throughout and in which.

DESCRIPTION OF THE PREFERRED EMBODIMENTS

Figure 1:
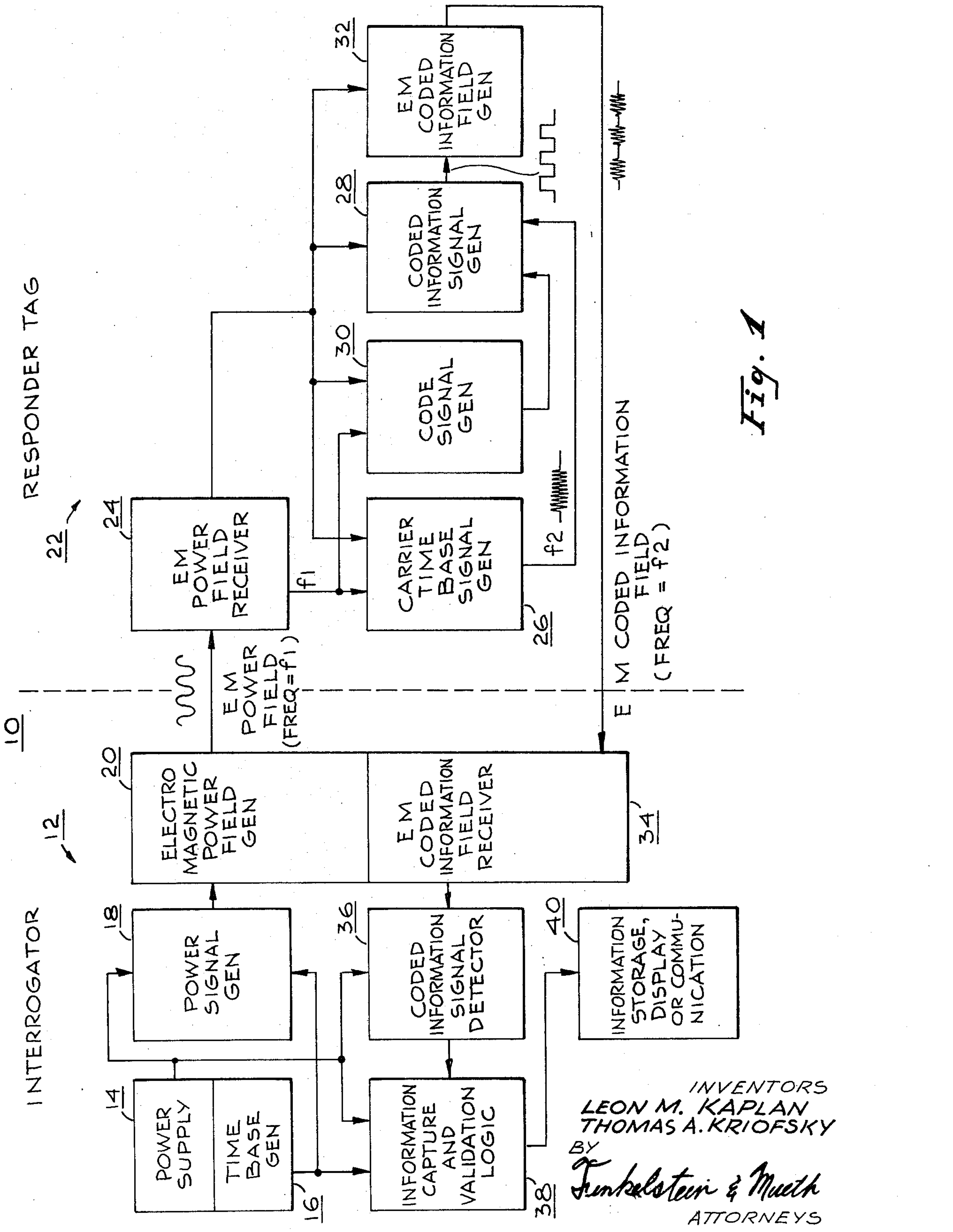
FIG. 1 is a block diagram of an interrogator-responder tag system according to the principals of this invention.

Referring now to FIG. 1 there is shown, in block diagram form, the general arrangement of one embodiment generally designated 10 of a preferred form of an interrogator and responder tag according to the principals of the invention.

As shown, the interrogator means, generally designated 12, is comprised of a power supply 14 for generating a controlled source of electric energy that is utilized to provide the basic power for the interrogator means 12. A time-base generator 16 is operatively connected with the power supply 14 and generates an appropriate time-base signal.

A power signal generator 18 receives the controlled source of electric energy from the power supply 14 as well as a time-base signal from the time-base generator 16 and generates an AC power signal that is coupled into an electromagnetic power field generator means 20 operating at frequency $f_1$. The power field generator means, in this embodiment of the invention, may comprise one or more induction coils that is utilized to generate an electromagnetic power field within inductive coupling range of the responder tag generally designated 22. The responder tag 22 has an electromagnetic power field receiver means 24 which, in a preferred embodiment, may comprise a high permeability coil means for the inductive coupling to extract energy from the power field provided by the power field generator 20 and the power field receiver 24 generates a DC responder tag power signal in response to the presence of the power field applied thereto. The DC responder tag power signal is utilized to provide the power for the responder tag. In this embodiment of the invention the responder tag 22 is passive and all power into the responder tag 22 is from the electromagnetic power field inductively coupled into the power field receiver 24.

The responder tag 22 also comprises a carrier time-base signal generator 26 operating at frequency $f_2$ that receives the DC responder tag power signal and generates an AC carrier time-base signal in response thereto. The AC carrier time-base signal is selected to have a frequency substantially different from the electromagnetic power field frequency. For example, the electromagnetic power field may have the frequency on the order of $f_1$=50 kiloHertz and the carrier time-base signal frequency may be on the order of $f_2$=450 kiloHertz in order to prevent interference between the electromagnetic power field and the electromagnetic coded information field coupled to the interrogator 12 by the responder tag 22, as described below.

The AC carrier time-base signal generator 26 may comprise a frequency multiplier utilizing the electromagnetic power field frequency $f_1$ as the input frequency and a higher harmonic of $f_1$ as the output frequency $f_2$, or a self contained oscillator operating at frequency $f_2$.

The carrier time-base signal is coupled into the coded information signal generator 28 that also receives an unique code signal from a code signal generator 30.

The code signal generator 30 may be an integrated circuit comprising a metal oxide semiconductor multiplexer, a complimentary metal oxide semiconductor multiplexer, silicon on sapphire semiconductor multiplexer or the like. That is, it should provide a high information bit capability in a comparatively small volume and utilizing a comparatively small amount of power. The code signal generator 30 generates a code that is unique to the particular responder tag and the code signal itself is comprised generally of a binary notation code in which there is provided a plurality of bits corresponding to each information digit. Eight bits are utilized as a synchronization or keying portion of the code signal in this embodiment. The remaining bits in the code signal define, in binary terms, in this embodiment, an information signal portion that is unique to the particular responder tag.

The code signal generator 30 may comprise a multiplexer control counter which utilizes the frequency $f_1$ of the electromagnetic power field or a sub harmonic as the signal frequency or which utilizes the frequency of a self contained oscillator as the code signal frequency.

The code signal is applied to the coded information signal generator 28 from the code signal generator 30 and it is utilized to modulate the carrier time-base signal. In the embodiment shown in FIGS. 1 and 2 the modulation is am amplitude modulation.

The coded information signal comprising the amplitude modulated carrier time-base signal is inductively coupled from the electromagnetic coded information field generator 32 to the electromagnetic coded information field receiver 34 of the interrogator means 12. The appropriate signal forms at the various portions of the responder tags are indicated on FIG. 1.

The coded information signal receiver may, as noted above, be incorporated into a plurality of three induction coils in an orthogonal orientation to serve sequentially the functions of both the coded information field receiver 34 and the power field generator 20.

The coded information signal is detected in the coded information signal detection stage 36 and the detected coded information signal is fed to the logic stage 38. The logic stage detects the synchronizing and keying portion of the information signal and then generates an output signal having an information content that corresponds to the unique information portion of the information signal after checking for parity and true signal detection. The output signal may then be utilized in any type of storage or display or communication device 40 desired.

Figure 2:
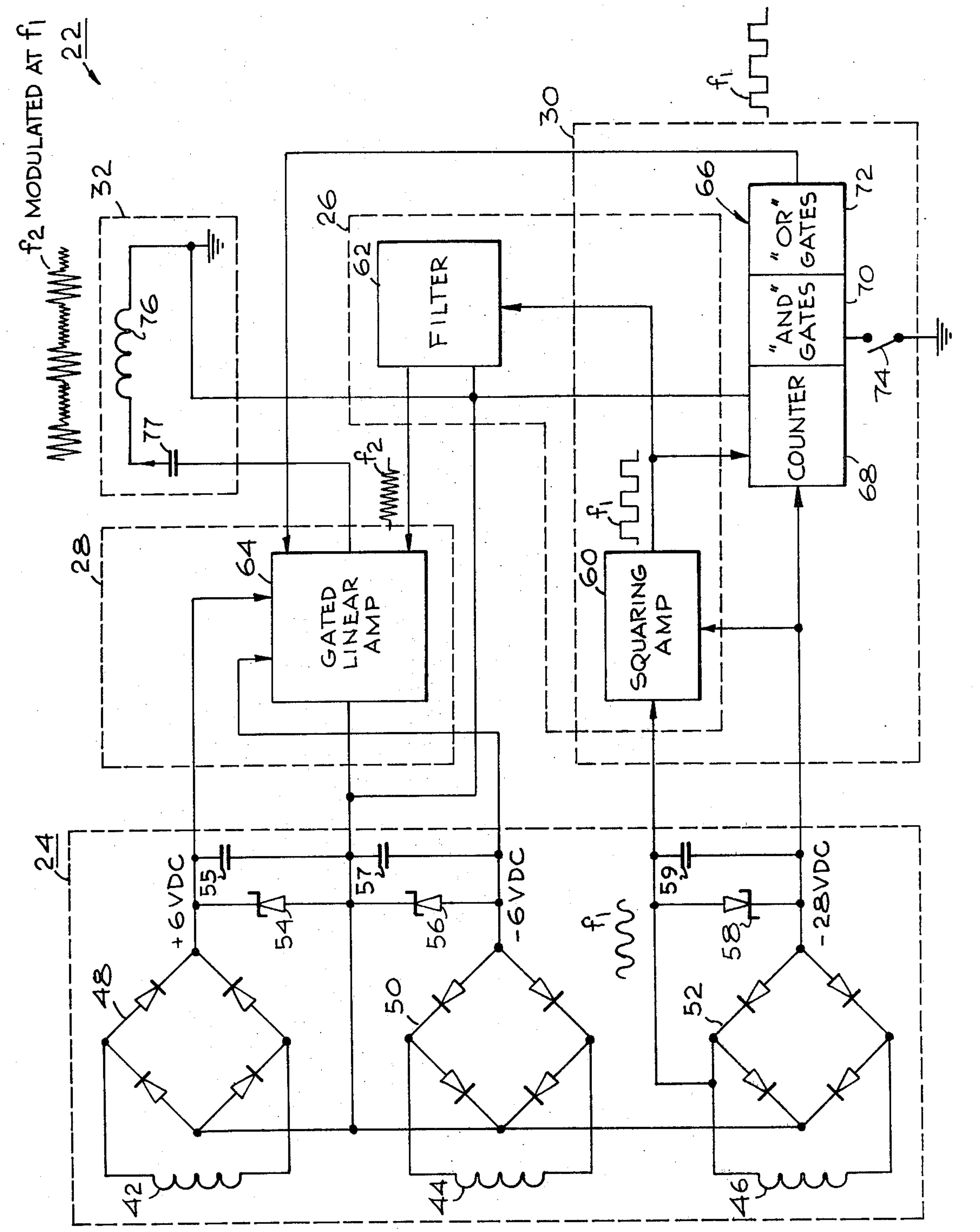
FIG. 2 is a circuit diagram, partially in block diagram form, of the responder tag.

FIG. 2 illustrates the responder tag 22 shown in FIG. 1. As shown in FIG. 2 the power field receiver 24 that receives the electromagnetic power field is, in this embodiment of the invention, comprised of a plurality of three loop-stick coils 42, 44 and 46 for providing the inductive coupling to the AC power input signal and three four diode bridge means 48, 50 and 52 utilized as full wave rectifiers. The number of such bridge means and the number of different DC voltages that must be provided depends upon the particular circuit parameters and types of components utilized in the responder tag 22. As shown, diode bridge 48 and coil 42 provide a +6 volt signal, diode bridge 50 and coil 44 provide a −6 DC signal and diode bridge 52 and coil 46 provide a −28 volt DC signal. Since the magnitude of the DC voltages that are generated in the diode bridges 48, 50 and 52, are proportional to the proximity of the responder tag 22 to the power field generator 20 of the interrogator means 12, zener diodes 54, 56 and 58 are incorporated as DC voltage amplitude limiting means so that overly high DC voltages are not generated in the responder tag 22 if the responder tag 22 happens to be exceptionally close to the interrogator means 13. Similarly, filter capacitors, 55, 57 and 59 are incorporated to eliminate ripple.

The carrier time-base signal generator 26 is comprised, in this embodiment of the invention, of a squaring amplifier 60 that receives both the DC responder tag power signal at −28 volts from diode bridge 52 as well as an AC signal tapped between the coil 46 and the diode bridge 52 at the electromagnetic power field frequency $f_1$ which, as noted above, may be on the order of 50 kiloHertz. The squaring amplifier 60 provides essentially a squarewave at frequency $f_1$ that is fed into a filter means 62. The filter means 62 may, in this particular embodiment of the invention, comprise a Clevite Model 202A ceramic filter and the filter means 62 converts the squarewave signal at frequency into the carrier time-base signal at frequency $f_2$, for example, 450 kiloHertz. The carrier time-base signal at frequency $f_2$ is fed into a gated linear amplifier 64 which, in this embodiment of the invention, provides the appropriate modulation of the carrier time-base signal as described below. The gated linear amplifier 64 also receives the +6 volt signal from the diode bridge 48 and the −6 volt signal from the diode bridge 50, in accordance with well-known electronic practice techniques. It will be appreciated by those skilled in the art that changing the particular components in the responder tag 22 can change the requirements for a particular voltage level. Therefore this invention is intended to cover all such variations of the responder tag that comprise variations of components necessitating different voltage signals.

The code signal generator 30 utilizes and may be considered to incorporate as part of it the squaring amplifier 60 as well as the counter/multiplexer stage 66. The counter/multiplexer stage 66 may be any desired type of counter/multiplexer, such as a Philco-Ford PL 4516 and generally comprises a counter-stage 68, a plurality of AND gates 70, and a plurality of OR gates 72. The counter 68 receives the DC responder tag power signal from the diode bridge 52 as well as the squarewave from the squaring amplifier 60 at frequency $f_1$. When the multiplexer 66 is, for example, metal oxide semiconductor type multiplexer such as the Philco-Ford Model PL 4516, the sequencing through the counter, AND gates and OR gates proceeds in accordance with the known design parameters thereof and the switch means 74 indicated as coupled to the AND gates 70 is representative of a grounding switch for each individual AND gate. Thus, depending upon the particular binary code number that is encoded into the counter/multiplexer 66 before it is incorporated into the responder tag 22 the counter/multiplexer 66 generates an output signal comprising a code signal that is fed into the gated linear amplifier 64 for appropriate modulation of the carrier time-base signal.

In the preferred embodiments of the invention, the coded information signal comprises a binary signal and as shown by the embodiment illustrated in FIG. 1 and in FIG. 2 the coded binary signal is applied as an amplitude modulator to the carrier time-base signal in the gated linear amplifier 64 which feeds the modulated signal into the electromagnetic coded information field generator 32 which comprises a responder coil 76. Capacitor 77 may be included for the coil 76. The responder coil 76 is an induction coil and inductively couples the indicated amplitude modulated field back to the coded information field receiver 34 of the interrogator means 12.

Figure 3:
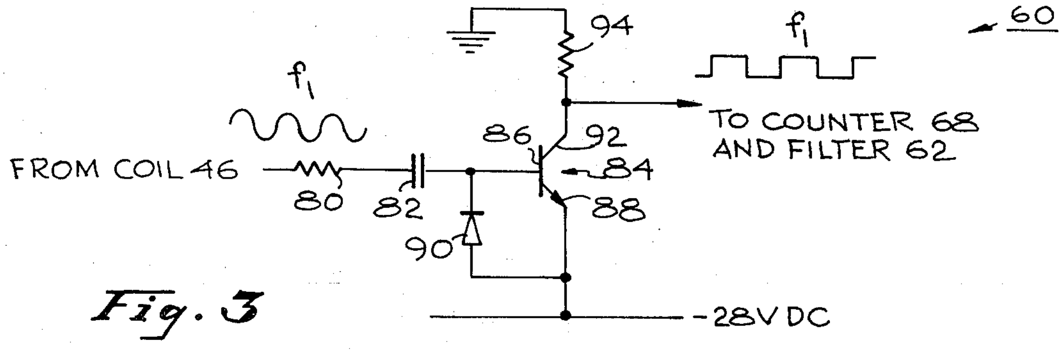
FIG. 3 is a circuit diagram of a squaring amplifier shown in FIG. 2.

FIG. 3 illustrates one embodiment of a squaring amplifier 60 useful in the practice of the invention herein and, in particular, the embodiment of the responder tag 22 shown in FIG. 2. As shown, the squaring amplifier 60 receives the frequency $f_1$ signal from coil 46 through resistor 80 and capacitor 82 and is applied therefrom to the base 86 of a transistor 84. The emitter 88 of transistor 84 is connected to the −28 VDC bus and the base to emitter connection is provided through diode 90. The collector 92 of the transistor 84 is connected to ground through resistor 94 and the squared frequency $f_1$signal is obtained at the collector electrode 92 of transistor 84 for application to the counter 68 and filter 62.

Figure 4:
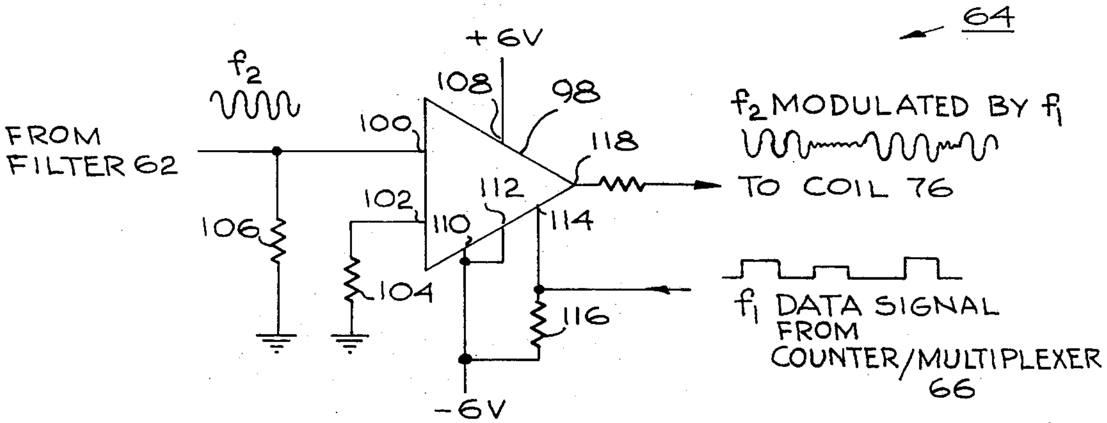
FIG. 4 is a circuit diagram of a gated linear amplifier shown in FIG. 2.

The gated linear amplifier 64 shown in FIG. 2 may also be comprised of a particular circuit that has been found useful in the practice of the present invention in the responder tag 22. FIG. 4 illustrates a circuit diagram for one embodiment of a gated linear amplifier 64 that has such utility. As shown on FIG. 4 the gated linear amplifier 64 is comprised of the amplifier 98 which, for example, may be an RCA CA3002 that receives the frequency $f_2$ signal from the filter 62 at a first terminal 100 thereof. A second terminal 102 is connected to ground through resistor 104. Resistor 106 also provides a ground connection for the frequency $f_2$ signal applied to first terminal 100. The +6 volt signal from the diode bridge 48 is applied to third terminal 108 of the amplifier 98 and the −6 volt signal from the diode bridge 50 is applied to fourth and fifth terminals 110 and 112. The frequency $f_1$ data signal from the multiplexer 66 is applied to sixth terminal 114 of the amplifier 98 and is biased to the −6 volt signal through resistor 116. At the output terminal 118 of the amplifier 98 there is provided the frequency $f_2$ signal modulated by the frequency $f_1$ data signal which is applied to the coil 76 for transmission back to the interrogator 12.

In the above description of the responder tag 22, it will be appreciated that one particular embodiment of the invention has been illustrated and described. Many variations of the particular circuit details may be made by those skilled in the art. For example, the three filter rectifier diode bridges 48, 50 and 52 could be replaced with just one filter rectifier diode bridge to provide a single output voltage of, for example, +12 VDC which would then be utilized for all tag operations. Similarly, in other variations of the present invention, the filter rectifier diode bridges could be replaced by a full wave rectifier. It will be appreciated, of course, that in preferred embodiments of the present invention it is desired to have a high degree of flux capture by the coil such as coils 42, 44 and 46. Therefore, in such preferred embodiments of the invention it is desired to utilize high permeability coils to achieve the highest degree of flux capture within a given tag dimension.

In other variations of the present invention, squaring amplifier 60 may be replaced by a self-contained oscillator operating at frequency $f_1$ or at any other frequency substantially less than frequency $f_2$; and/or filter 62 may be replaced by a self-contained oscillator operating at frequency $f_2$; and/or gated linear amplifier 64 may be replaced by the appropriate functions required to achieve other forms of modulation such as frequency modulation or phase modulation; and/or filter 62 and gated linear amplifier 64 may be replaced by a gated oscillator which is gated by the data signal from counter/multiplexer 66 and which is controlled in frequency by the series combination of coil 76 and capacitor 77; and/or counter/multiplexer 66 may be replaced by any of the commonly known forms of generating serial information signals such as parallel input-serial output shift registers, johnson counters, and the like. As noted above the present invention also contemplates utilization of a preferred form of interrogator structure arrangement wherein the power field is inductively coupled to the responder tag and the coded information field is received from the responder tag to provide appropriate reading and identification of the information content contained herein.

Figure 5A:
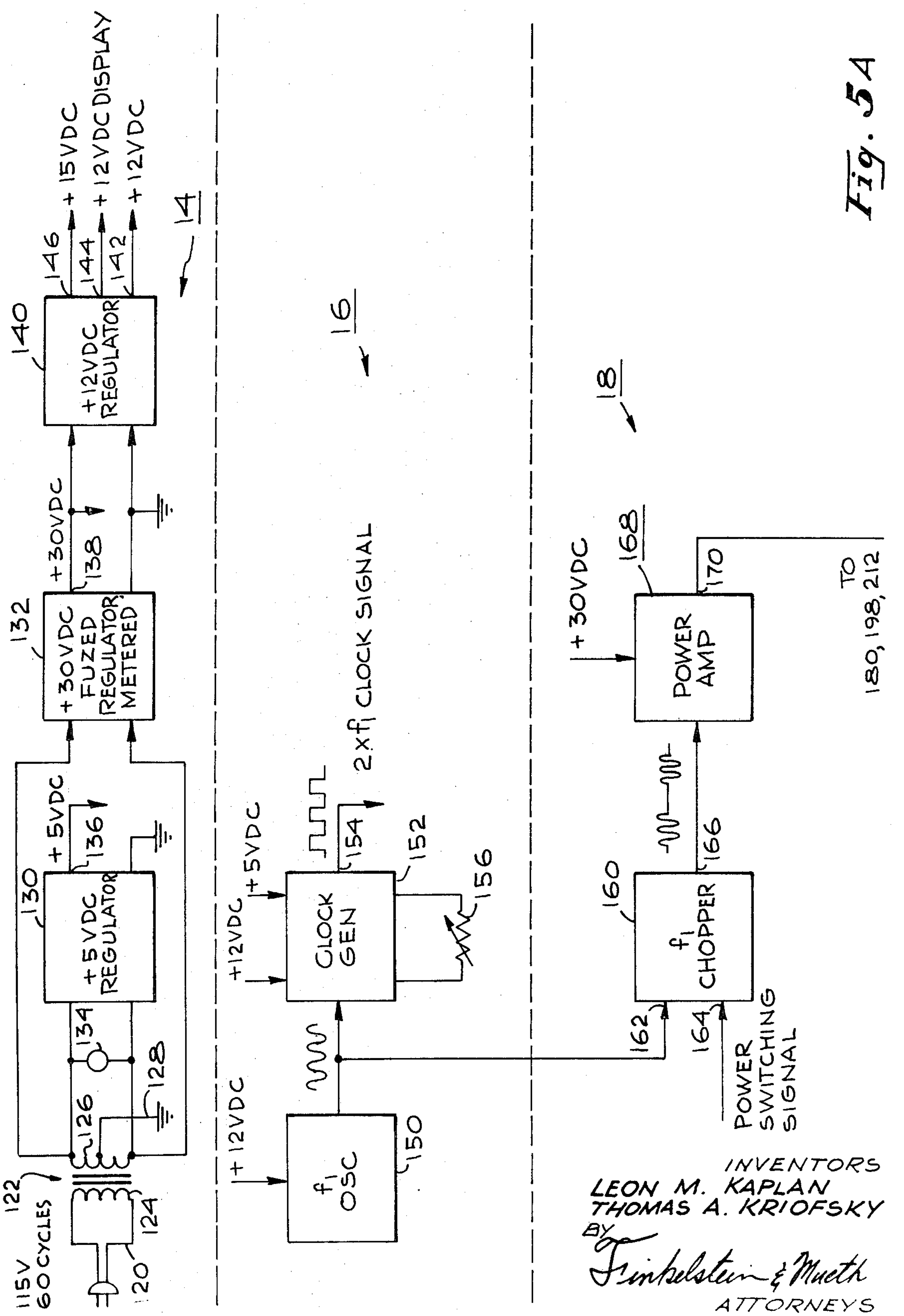
FIGS. 5A and 5B show a circuit diagram, partially in block diagram form, of the interrogator without the logic section.
Figure 5B:
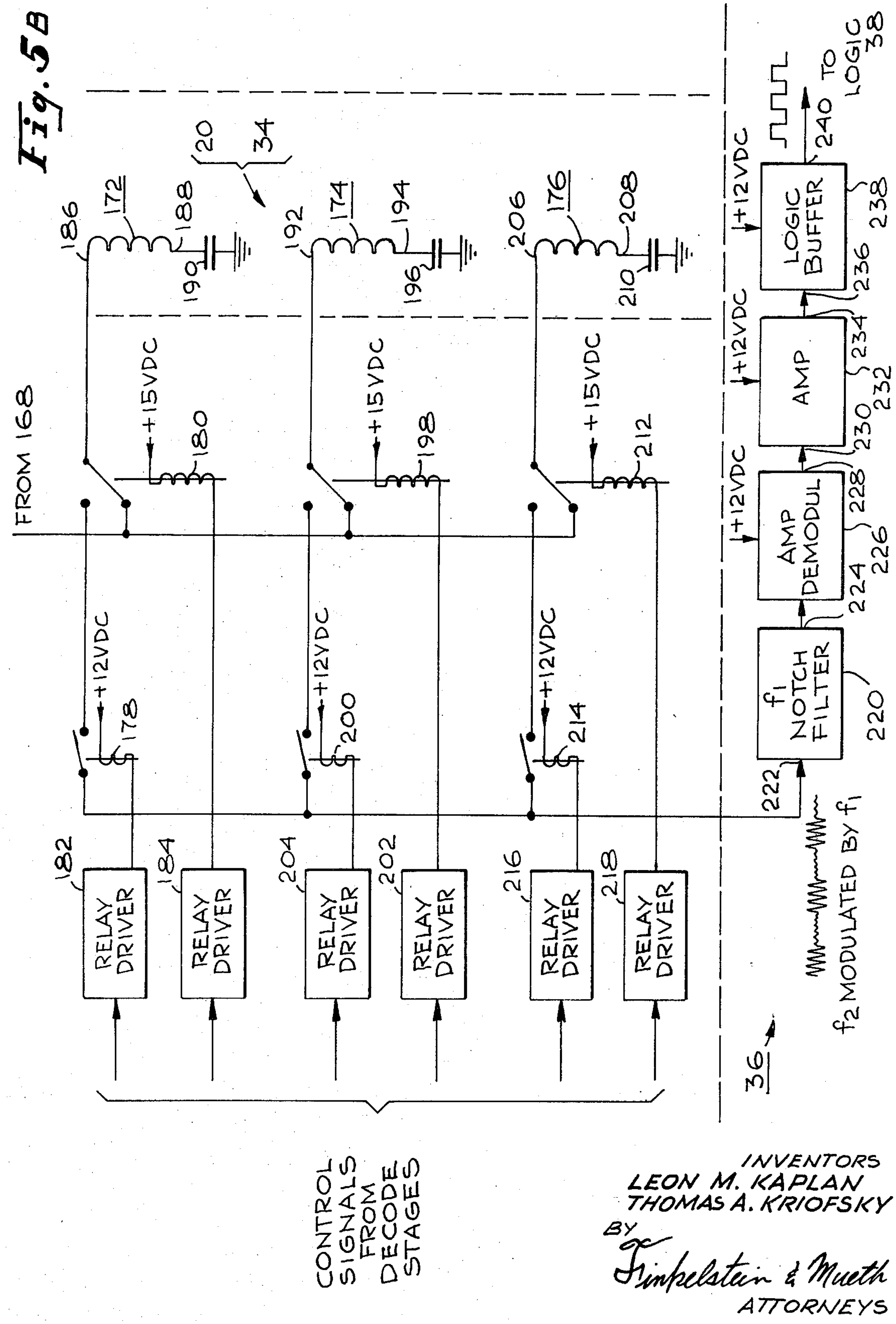

FIG. 5 illustrates a portion of the interrogator 12 partially in block diagram form and partially in schematic diagram form. As shown on FIG. 5 there is provided a power supply means 14 utilized to generate the various voltage signals necessary for operation of the interrogator 12. The power supply 14 receives conventional 115 V, 60 cycle power at an input indicated at 120. This input power is applied to a transformer 122 at the primary 124 thereof. The secondary 126 of the transformer 122 is a center tap to ground at 128 and the secondary 126 is connected to a +5 VDC regulator 130 and a +30 VDC fused metered regulator 132. A pilot light 134 is connected across the secondary 126 of transformer 122 for a visual observation of the operational condition thereof. The +5 VDC regulator 130 provides a +5 VDC signal at the output 136 thereof that, as noted below, is utilized in various portions of the structure. Similarly, the +30 VDC regulator 132 provides +30 VDC signal at its output 138 for utilization in a +12 VDC regulator 140 and other portions of the interrogator 12 as described below. The +12 VDC regulator provides, as an output thereof, a +12 VDC signal at a first output 142, a +12 VDC display signal 144 that is utilized only for the high order and low order display as indicated below and a +15 VDC signal at a third output 146. The +15 VDC signal and +12 VDC signal are utilized in other structure of the interrogator 12 as described below. Thus, in this embodiment of the present invention there is provided the +5 VDC signal, the +30 VDC signal, the +15 VDC signal, the +12 VDC signal and the +12 VDC display signal which are utilized for the various operations required in the interrogator 12. Other structural adaptations and arrangements of the interrogator 12 may utilize the same or other signals. It will be appreciated that the power supply 14 may be readily adapted by those skilled in the art to provide the voltages and/or signal contents necessary for utilization in any desired type of interrogator according to the principals of the present invention.

The time-base generator 16 shown on FIG. 5 incorporates the frequency $f_1$ oscillator 150, for example $f_1$ =50 kiloHertz as mentioned above, that is powered by the +12 VDC signal. The signal from the frequency $f_1$ oscillator is fed into a clock generator 152 that is powered by the +12 VDC signal and the +5 VDC signal and provides, at its output 154 thereof the squarewave frequency $2\times f_1$ clock signal (which is double the frequency of the signal from the frequency $f_1$ oscillator 150.) The frequency $2\times f_1$ clock signal is utilized as the time clock base throughout the operation of the interrogator 12 in the applications and portions thereof as described below. Phase adjustment on the clock generator 152 may be provided by, for example, variable resistor 156 connected thereacross.

As noted above the interrogator 12 provides, as part of its function, the generation of a power signal which is coupled to an electromagnetic power field generator for subsequent inductive coupling to the responder tag. The power signal generator 18, as shown on FIG. 5, is generally comprised of a frequency $f_1$ chopper 160 that receives the frequency $f_1$ oscillator 150 output signal at a first input terminal 162 thereof and a power switching signal at a second input terminal 164 thereof. The generation of the power switching signal is described below in connection with FIG. 7. Thus, the frequency $f_1$ chopper 160 provides an output signal at the output terminal 166 thereof that is chopped as indicated by the waveform shown. This chopped frequency $f_1$ signal is fed into a power amplifier 168, that is powered by the +30 VDC signal from the power supply 14 and the output signal from power amplifier 168 at the output terminal 170 thereof is the power signal that is transformed to an electromagnetic power field to be inductively coupled from the interrogator 12 to the responder tag 22.

Figure 6:
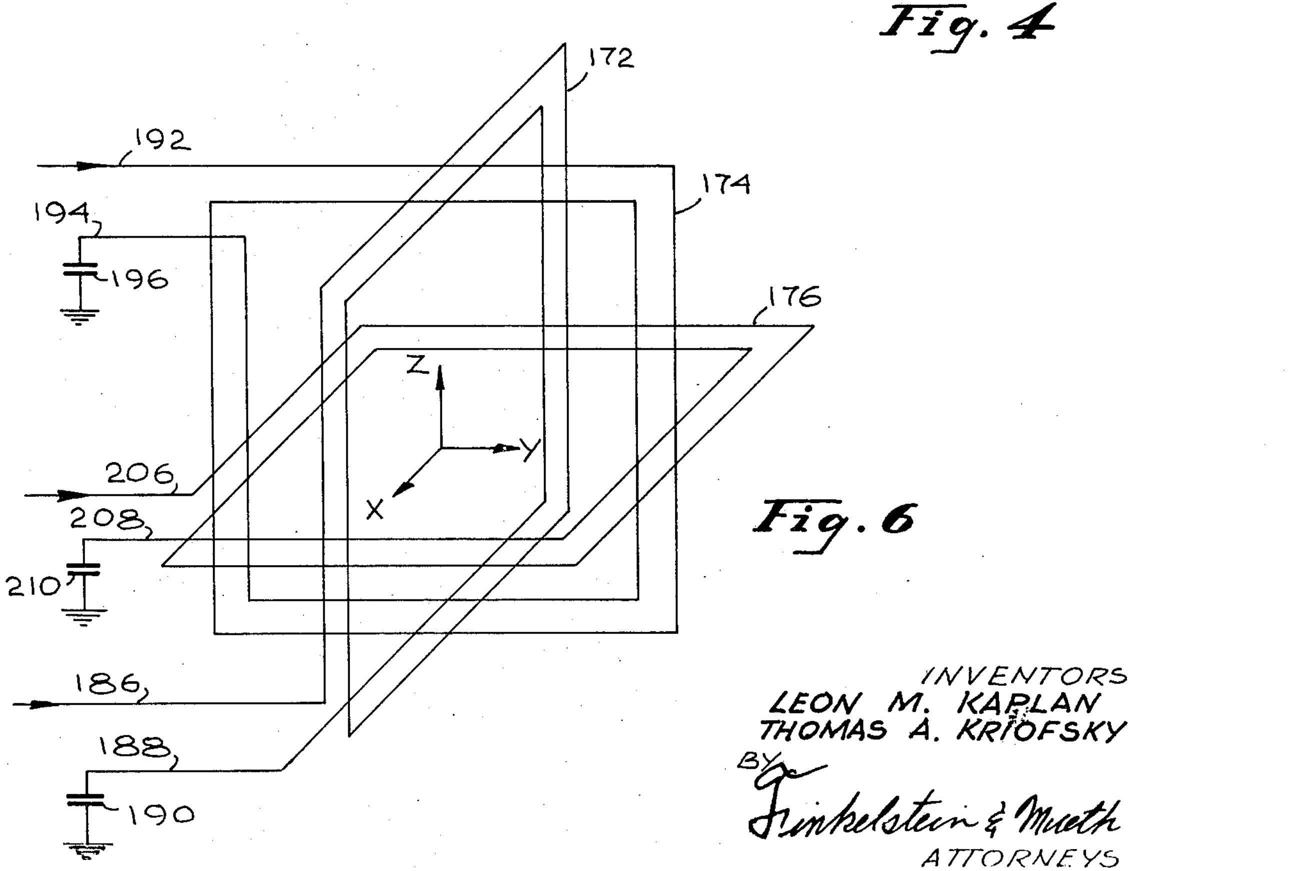
FIG. 6 is a detail configuration of the interrogator electromagnetic power field generator.

As noted above, the coupling of the power field to the responder tag 22 is preferably by inductive coupling between the interrogator 12 and the responder tag 22 and, as such, the interrogator 12 is provided with three field generation coils 172, 174 and 176. For convenience, on FIG. 5, these coils are merely shown in conventional circuit diagram format. However, in practice, in this embodiment of the present invention, the coils are generally arranged in mutually orthogonal fashion in the X, Y and Z axis. FIG. 6 illustrates such an arrangement of the coils preferred for operation of the interrogator 12. Thus, first coil 172 may be oriented in the plane of the X Z axis. Second coil 174 may be oriented in the plane of the Y Z axis and third coil 176 may be oriented in the X Y axis. These coils 172, 174 and 176 may, in some embodiments of the present invention, be made comparatively large and be placed completely surrounding, for example, a moving belt upon which the luggage or cargo or other item having a responder tag 22 thereon is moving. As such an item moves through the field generated by the three mutually perpendicular coils 172, 174 and 176 power is applied to the coil for activation of the responder tag 22 which, in response to the power field received, generates and inductively couples back to the interrogator 12 the coded information field. In the present embodiment of the invention the three coils 172, 174 and 176 function as both the power field generator 20 as well as the coded information field receiver 34. That is, not only do the three coils 172, 174 and 176 generate the power field for the power field receiver 24 of the responder tag 22 but also receive back the coded information field from the coded information field generator 32 of the responder tag 22. In this embodiment of the present invention this combined field generation and receiving capability is conducted substantially simultaneously by the three coils 172, 174 and 176 as controlled by control signals from the decode stages, as described below, applied to a pair of relay drivers coupled to relays associated with each coil. Thus, first coil 172 is controlled by operation of a first sense relay 178 and a first power relay 180. The first sense relay 178 is controlled by a first sense relay driver 182 that receives an appropriate control signal from the decode stages. Similarly, the first power relay 180 is controlled by a first power relay driver 184 that also receives a control signal from the decode stages. Thus, the first coil 172 may generate a power field upon selective operation of the power relay 180 from the signal received from the power amplifier 168 applied to the input 186 of the first coil 172. The first power relay 180 receives its power from the +15 VDC signal generated in the 12 VDC regulator 140 of the power supply means 14. Similarly, the first coil 172 may be utilized to receive the coded information field from the coded information field generator 32 of the responder tag 22 by selective operation of the first sense relay 178 by the first sense relay driver 182. The first sense relay 178 receives the +12 VDC power from the 12 VDC regulator 140 of the power supply stage 14 and when selective operation of the first sense relay 178 and first power relay 180 by the appropriate control signals applied to their respective relay drivers is achieved the coded information field may be coupled from the responder tag 22 back to the interrogator 12. The output 188 of the first coil 172 is connected to a capacitor 190 that is connected to ground potential.

Similarly, the second coil 174 has an input 192 and an output 194. The output 194 is connected to a second capacitor 196 that is also connected to ground potential. Signals are applied to the input 192 of the second coil 174 by selective operation of a second power relay 198 and a second sense relay 200. The second power relay 198 also receives its power from the +15 VDC signal and the second sense relay 200 receives power from the +12 VDC signal. The second power relay 198 is controlled by second power relay driver 202 and the second sense relay 200 is controlled by second sense relay drive 204. Both the second sense relay drive 204 and the second power relay driver 202 receive their controlling signals from the decode stages as described below.

The third coil 176 also has an input 206 and an output 208. The output 208 is connected to a capacitor 210 that is connected to ground potential. Power is supplied to the third coil 176 in the manner described above for the first coil 172 and second coil 174. The third coil 176 receives its power from the signal generated in the power amplifier 168 applied to the input 206 upon selective operation of the third power relay 212 receiving its power from the +15 VDC signal generated in the +12 VDC regulator 140 of the power supply 14. A third sense relay 214 powered by the +12 volt signal from the +12 VDC regulator 140 of the power supply 14 is selectively operated to allow receipt of the coded information field from the coded information field generator 32 of the responder tag 22. The third sense relay 214 is controlled by a third sense relay driver 216 and the third power relay 212 is controlled by the third power relay driver 218, both of which receive their control signals from the decode stages as indicated below.

In the preferred embodiment of the present invention, as noted above, the three coils 172, 174 and 176 are sequentially operated in the generate and receive signal conditions by selective operation of the first power relay 180, second power relay 198, third power relay 212 and the first sense relay 178, second sense relay 200 and third sense relay 214. One mode of such sequential operation that has been found to be advantageous in the practice of the present invention has been to have one coil in the generate condition, that is generating a power field for the responder tag 22 by applying the power amplifier 168 output signal to the coil. For example, coil 172 as shown in FIG. 5 is in the power field generation condition for the positions of the first power relay 180 and first sense relay 178.

During the time that power is being applied to the coil 172 for inductive coupling to the responder tag 22 the second coil 174 and the third coil 176 are sequentially operated in the receive mode through the second sense relay 200 and third sense relay 214. That is, in this mode of operation the second coil 174 may be in the receive condition that is, with the relay 198 not energized and in the opposite position from that shown in FIG. 5 and the second sense relay 200 energized into the opposite position shown in FIG. 5. This allows transmission of the signal from the coil 174 into the interrogator 12, as described below. During this time period that the second coil 174 is in the receiving position the third coil 176 is in a "null" condition. That is, the third power relay 212 would be in the opposite position from that shown in FIG. 5 and the third sense relay 214 would be deenergized and in the position shown in FIG. 5 and thus no field would be either generated or received by the third coil 176. This receive condition by the second coil 174 and simultaneous null condition by the third coil 176 continues for one-half of the time period that the first coil 172 is in the generate condition and then the second coil 174 is switched to the null condition and the third coil 176 is switched to the receive condition. This simultaneous operational condition continues for the second half of the generate time period for the first coil 172. After this sequential operation involving the first coil 172, second coil 174 and third coil 176, the second coil 174 may be switched to the generate condition and the first coil 172 and third coil 176 sequentially in the receive and null conditions. Then the third coil 176 may be in the generate condition and the first coil 172 and second coil 174 sequentially operated in the null and receive condition. It will be appreciated that other selective sequential operating modes of the three mutually perpendicular coils 172, 174, and 176 may be selected for switching between the generate receive and/or null conditions. Specific applications may require specific cycling and sequencing operations.

In the preferred embodiments of the present invention, in order to minimize power utilization, it is preferred that the power field generated by the coils 172, 174 and 176 be pulsed. While pulsing may not be necessary in applications where unlimited power is available at the power input 120 to the power supply 14, in other and perhaps more remote locations where battery power or other types of limited power is available to the interrogator 12 the pulsing arrangement of power into the coils is desirable to minimize the electrical energy utilized. The current associated with the 30 VDC signal is preferably monitored in order to detect if the coils 172, 174 and 176 which are in the present application of the invention tuned for air generation and receiving, become detuned due to presence of a large metal or iron objects near them. Such objects would change the inductance of the coils and thereby detune them from resonance at frequency $f_1$ for which they are air tuned and thus decrease the generated power field. In order to maintain the power field at a given magnitude regardless of adjacent metal objects the power amplifier 168 may incorporate a current regulation capability so that a constant power is applied to the coils regardless of the presence (or absence) of adjacent metal or other detuning structure. Alternately, in order to maintain the power field at a given magnitude regardless of adjacent metal objects the frequency $f_1$ oscillator may be regulated to provide a frequency output which tracks the resonant frequency of the coils.

It will be appreciated that, in order to minimize arcing when relays are utilized to control the three coils 172, 174, 176, it is preferred that the switching of the relays take place when no power is applied thereto. It will also be appreciated that the relay utilization may be replaced by appropriate solid state devices such as silicon controlled rectifiers and the like.

Thus, at any given instant of time at least one of the three coils 172, 174, 176 are in the signal receiving condition of operation. As such, when a coded information field is being generated by a responder tag 22 it is received and fed to a frequency $f_1$ notched filter 220, as shown on FIG. 5, which is part of the coded information signal detector 36. The notched filter is utilized to filter any components of the interrogator power field which might be cross coupled from the particular coil of the three coils 172, 174, 176 which are in the generate condition to the coil that is in the signal receiving operational condition. It will be appreciated by those skilled in the art that even through the coils 172, 174, 176 are preferably orthogonal, there may be some amount of cross coupling between the generating and receiving coils due to the tolerance on the degree of orthogonality provided and because of some field distortion resulting from the presence of the responder tag 22 within the field generated by the three coils 172, 174, and 176. Therefore, preferably the notch filter design utilizes a technique identified as a "twin-T network," which allows all frequencies to pass through at some small fixed attenuation, except the selected notch frequency which is attenuated very greatly. Thus, the coded information signal applied to the input 222 of the frequency $f_1$ notch filter 220 is the frequency signal amplitude modulated at frequency $f_2$ generated in the coded information field generator 32. This coded information signal contains the particular code applicable to the particular responder tag 22 present within the field of the three coils 172, 174 and 176. Alternately, in order to eliminate the cross coupling at frequency $f_1$, a high pass filter may be utilized as a replacement for notched filter 220.

The signal from the output 224 of the frequency $f_1$ notch filter 220 is applied to an amplifier-demodulator 226 that is powered by the +12 VDC signal. The amplifier-demodulator 226 provides the function of both amplification of the above-mentioned amplitude modulated signal and demodulation of the resultant amplified signal in order to recover the responder data signal. The amplifier-demodulator is, as with other components of the system of the present invention, preferably a semiconductor device and as such may be a National Semiconductor, Inc. Model LN372 amplifier-demodulator. The demodulated signal from the output 228 of the amplifier-demodulator 226 is applied to the input terminal 230 of an amplifier stage 232 that is powered by a +5 VDC signal. The amplifier provides a second stage of amplification for the demodulated signal and it has been found that in the present invention an RCA Model CA 3002 amplifier may be utilized. The amplified signal from the output 234 of the amplifier 232 is applied to an input terminal 236 of a logic buffer 238 that is powered by the +5 VDC signal. The logic buffer provides a demodulated data in the form of voltage and current levels that are compatible with the particular circuitry utilized in the logic section 38 described below. It has been found that a transistor driving a TTL logic element may be utilized to provide the appropriate voltage and current levels necessary for the particular type of circuitry utilized in the logic stage 38. The data signal at the output terminal 240 of the logic buffer 238 is the data signal corresponding to the particular tag 22 presented in appropriate digital form for utilization by the logic section 38.

Figure 7:
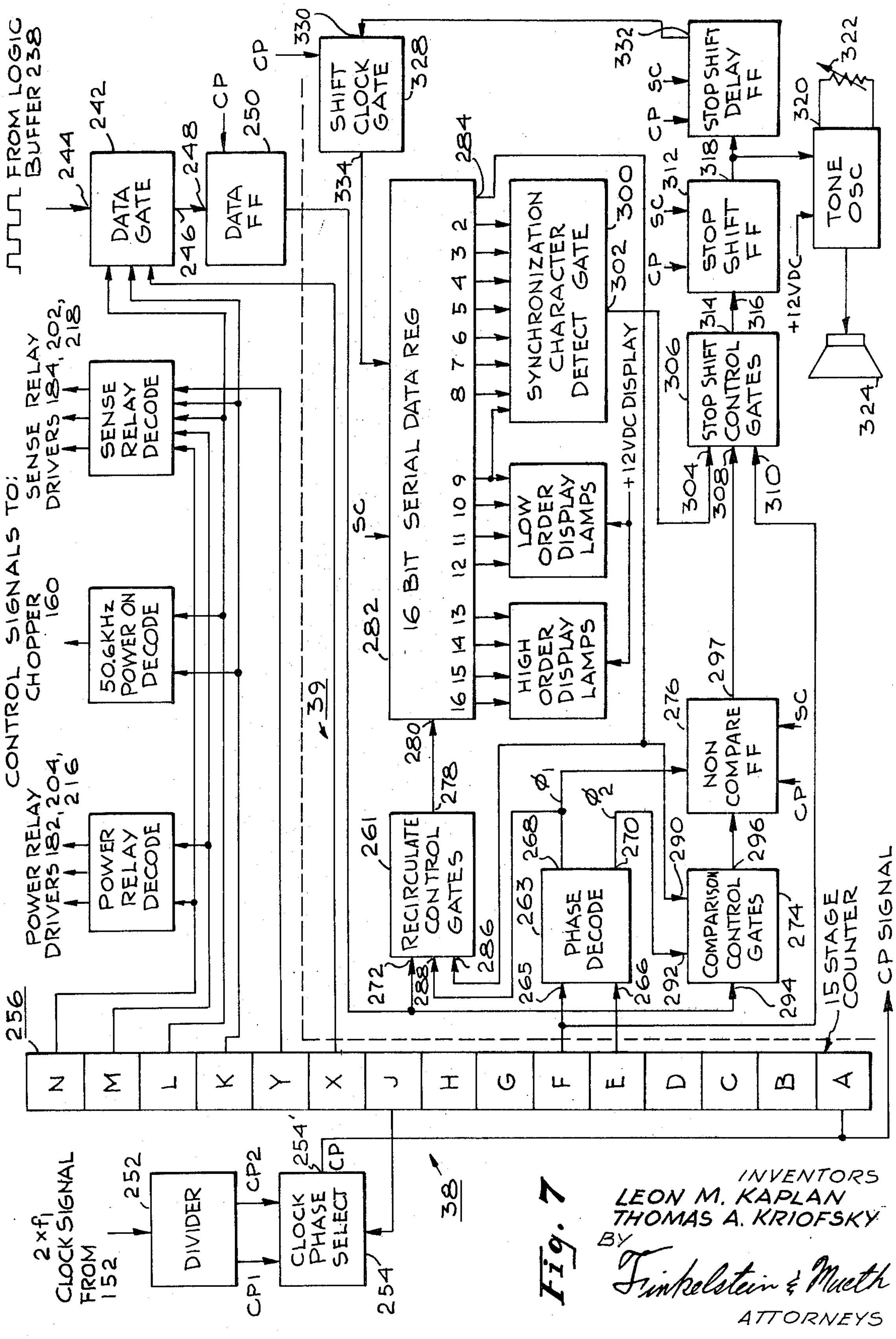
FIG. 7 is a block diagram of the interrogator logic section.

FIG. 7 illustrates the logic section 38 of the interrogator 12 according to one embodiment of the present invention. As shown, a data gate 240 receives the digital data signal from the logic buffer 238 at the input terminal 244 thereof. The data gate 242 provides a gated data signal at an output terminal 246 thereof which is applied to the input terminal 248 of a data flip flop 250. The data flip flop 250 also receives a clock pulse signal (CP). A divider 252 receives the frequency $2\times f1$ clock signal from clock generator 152 and divides it into two oppositely phased clock signals CP 1 and CP 2. The two oppositely phased clock signals CP 1 and CP 2 are fed into a clock phase select 254 which alternately feeds one or the other of the clock signals CP 1 or CP 2 to a 15 stage counter 256, and to other structure of the logic section 38 described below. The 15 stage counter 256 has stages *a, b, c, d, e, f, g, h, j, x, y, k, l, m* and *n*. The clock signal, whether CP 1 or CP 2 is fed into stage a of 15 stage counter 256 and the 15 stage counter 256 is a digital counter and counts the clock pulses, whether CP 1 or CP 2 digitally. When the counter is "full" that is all for example digital 1's up to stage *j* of 15 stage counter 256 a signal is sent from stage *j* back to clock phase select 254 and the clock phase select then switches from, for example, CP 1 to CP 2. Thus the signal received from stage *j* continuously switches from one to the other of the two oppositely phased signals CP 1 and CP 2 which is then provided at the output terminal 254 of the clock phase select 254.

In this embodiment of the present invention the lower frequency stages of the digital counter 256, such as stages *x, y, k, l, m* and *n*, are utilized for providing the appropriate signals for control of the relay drivers associated with each of the three coils 172, 174 and 176 shown on FIG. 5. Thus, a power relay decode means 260 receives signals from stages *m* and *n* of the 15 stage counter and upon receipt of such signals appropriately generates, sequentially, the control signals for the power relay drivers 182, 204 and 216 (shown in FIG. 5) that control the operation of the power relays 180, 198 and 212 respectively for enabling each of the three coils 172, 174 and 176 to be sequentially in the power field generation condition. A power on decode stage 262 receives signals from the *k* and *l* stages of the 15 stage digital counter 256 and, in response thereto, generates the appropriate control signal for providing the pulsed signal for the frequency $f_1$ chopper 160. A sense relay decode means 264 is provided and receives signals from the *y, k, l, m* and *n* stages of the 15 stage digital counter 256 and, in response thereto, generates the control signals for control of the sense relay drivers 182, 204 and 216 for control of the sense relays 178, 200 and 214, respectively, of the coils 172, 174 and 176 respectively, to allow the coils to be sequentially switched into the receiving or the null condition.

Figure 8:
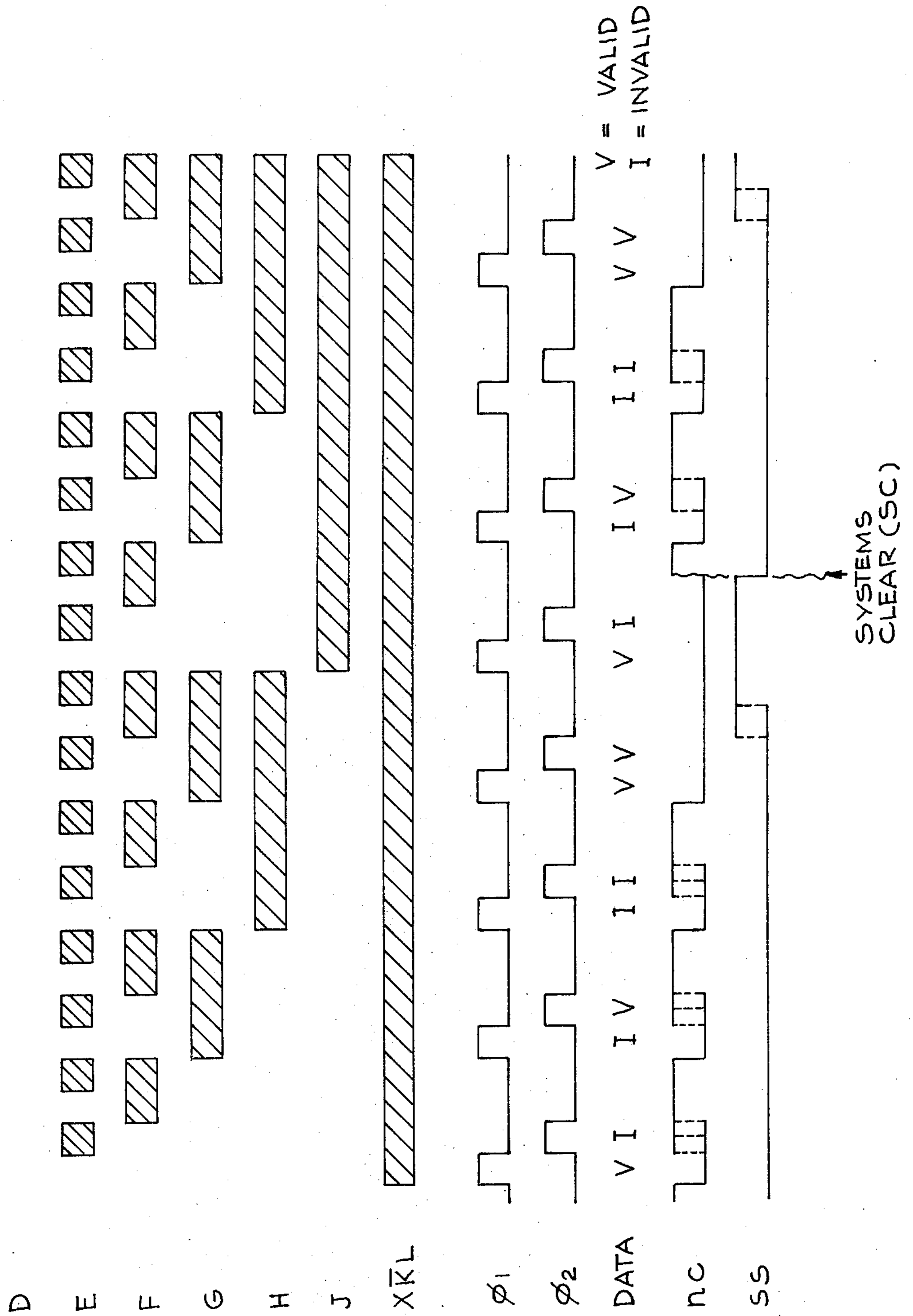
FIG. 8 is a timing diagram of the information capture and validation logic.

The *x, k* and *l* stages of the 15 stage counter 256 also are utilized to provide an enabling signal for the information validation portion of the logic means 38. Signals from the *x, k* and *l* stages of the 15 stage digital counter 256 are applied to the data gate 242. The data gate 242 operates to transmit the data signal from the logic buffer 238 to the data flip flop 250 when the appropriate *x, k* and *l* signals are present. FIG. 8 illustrates some of the characteristic signals of the logic section 38 during this time period when the appropriate *x, k* and *l* signals are present. For purposes of example only, it may be assumed that the responder tag 22 is designed to provide a repetitive 16 bit data word. Thus, 16 separate bits of information may be encoded in the responder tag 22 and such 16 bits will include both the information content desired in the responder tag 22 as well as any preselected synchronizing sequence.

During the time period when the appropriate *x, k* and *l* signals are present, there are 32 transmissions of the 16 bit data word. Since these transmissions can begin with any particular data bit in the total 16 bit word of the responder tag 22, there being no particular clock or timing relationship in this embodiment of the invention between the responder and interrogator, the validation and capture logic network is required. On FIG. 7 the validation and capture logic section 39 of the logic 38 provides these functions of validating and capturing the signal. In general, the validation and capture process may be considered as one in which there is a comparison of the transmissions received during the 0 1 signal and the 0 2 signal. If the transmissions are identical, the shift clock is stopped and the data is thereby captured for display, audio signal, visual signal or whatever desired capture indicating technique may be desired in any individual application. If the transmissions during the 0 1 and the 0 2 signal periods are not identical, the comparison process is repeated during the next sequential 0 1 and 0 2 signal periods. It will be appreciated that other checks on valid transmission can be performed. Such techniques as parity, error detection and/or correction codes, or a greater number of successive identical transmissions required to establish validation are well known to those practiced in the art. The particular type of validation and capture utilized in any particular application may be that determined by other system parameters.

During the 0 1 signal period the 0 1 signal is applied to the recirculation control gates 261 from the phase decode stage 263. The phase decode stage 263 receives an input signal at a first input terminal 265 from the *f* stage of the 15 stage counter 256 and a second input signal at a second input terminal 266 from the e stage of the 15 stage counter 256. Thus there is provided a 0 1 signal at a first output terminal 268 of the phase decode stage 263 and a 0 2 signal at a second output terminal 270 of the phase decode stage 263. The data signal from the data flip flop is also applied to the recirculation control gates at a data signal input terminal 272. During 0 1 signal time periods the comparison control gates 274 are disabled and the non-compare flip flop 276 is held at reset. During the 0 1 signal period a 16 bit transmission is gated through the recirculation control gates from the output terminal 278 thereof to the input terminal 280 of a 16 bit serial data register 282.

During the 0 2 signal period, the data which had previously been put into the 16 bit serial data register 282 is allowed to recirculate in the 16 bit serial data register 282 through the recirculation control gate 261 by application of the signal therefrom at an output terminal 284 back to an input terminal 286 on the recirculation control gates 261. The 0 1 signal is applied to the recirculation control gates 261 at a third input terminal 288.

During the 0 2 signal time period the comparison control gates 270, which also receive the information from the 16 bit serial data register 282 at an input terminal 290 as well as the 2 signal at a second input terminal 292 and the data signal from the data flip flop 250 at a third input terminal 294 providing an output signal at an output terminal 296, are enabled to permit the bit by bit comparison of the data from the serial register at output terminal 284 thereof with the data from the data flip flop 250. Thus, there is achieved a comparison of two successive transmissions. If the two transmissions during the 0 1 signal and 0 2 do not compare, the process is repeated during next and all subsequent cycles beginning with the 0 1 signal time period until a comparison is obtained. FIG. 8 shows the possible conditions for data transmission at the "data" line where a V equals valid and an I equals invalid, and the resultant effect on the state of the non-compare flip flop on the *nc* line. If the two successive transmissions do not result in a comparison during the 0 2 signal period then the non-compare flip flop 276 remains reset and a capture of the data in the field coupled from the responder 22 through the data flip flop 250 is achieved during the period of time from the end of 0 2 to the beginning of the next 0 1. That is, when the signal at stage *f* of the 15 stage counter 256 is a logic or a digital 1. During this time period, when a comparison exists, the data in the 16 bit serial data register 282 is recirculating. When a synchronization character which may be utilized in the signal as noted above is detected in bit positions 2 through 9 by the synchronization character detect gate 300 a signal is sent from an output terminal 302 thereof to an input terminal 304 on a stop shift control gate 306. This enables the stop shift control gate and since the stop shift control gate also receives an output signal from an output terminal 297 of a non-compare flip flop 276 at an input terminal 308 thereof as well as a bit signal from the *f* stage of the 15 stage counter 256 at a third input terminal 310, the stop shift flip flop 312 is set by the signal from the output terminal 314 of the stop shift control gate applied to the input terminal 316 of the stop shift flip flop. When the stop shift flip flop 312 is set an output signal at an output terminal 318 thereof is sent to a tone oscillator 320 having a volume adjust reostat 322 and which is powered by a +12 VDC signal for, if desired, an audio signal from the speaker 324. At the same time the output signal from the output terminal 318 of the stop shift flip flop 312 is sent to the stop shift delay flip flop 326 which sets the stop shift delay flip flop 326 upon receipt of the next clock pulse (CP). Setting the stop shift delay flip flop 326 disables the shift clock gate 328 by the signal applied at an input terminal 330 thereof from the output terminal 332 of the stop shift delay flip flop 326. Disabling the shift clock gate 328 prevents the application of the signal from the output terminal 334 thereof from being applied to the 16 bit serial data register 282. Since there is a one clock time delay from the synchronization character detection to the serial data register stop, such a one clock time delay allows the synchronization character and data to assume their proper position in the appropriate bit positions of the 16 bit serial data register 282. The data in bit positions nine through 16 is then held, due to the setting of the stop shift delay flip flop 326 for static display, or any other type of display or communication desired.

It will be appreciated by those skilled in the art that the entire validation and capture logic portion 39 of logic 38 may be adjusted to accommodate any desired number of data bits that can be encoded into the responder tag 22. It is only necessary to provide sufficient capacity in such components as, for example, the sixteen bit serial data register 282 or the 15 stage counter 256. In certain applications it may be desired to provide a "SYSTEMS CLEAR" signal which removes the display of the information data content in the detected signal and prepares the interrogator to receive information fields from subsequent responder tags. In such applications the system clear (SC) signal is applied to the 16 bit serial data register 282, non-compare flip flop 276, stop shift flip flop 312 and the stop shift delay flip flop 326.

Figure 9:
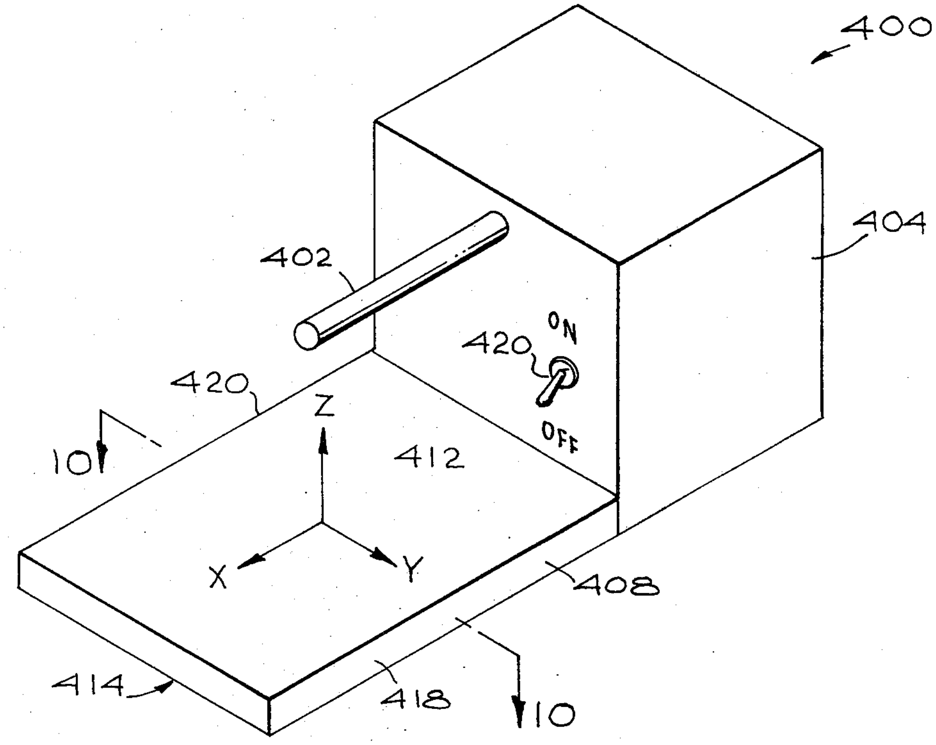
FIG. 9 is a pictorial of an interrogator with two dimensional capabilities.
Figure 10:
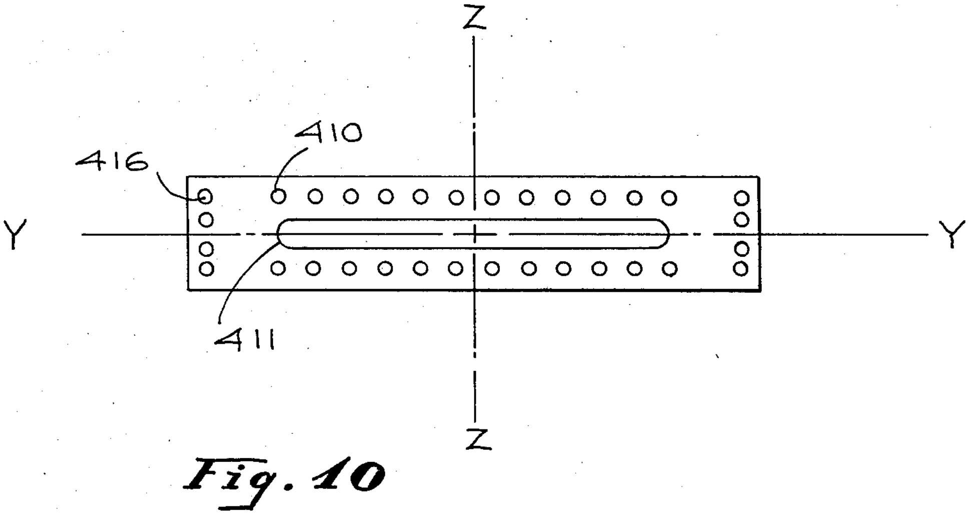
FIG. 10 is a section view of the two dimensional interrogator coil arrangement.

In this embodiment of the invention the clock pulse (CP) is shifted 180° from the CP 1 to the CP 2 when the 15 stage digital counter 256 has an appropriate change of signal at stage *j* thereof. Thus, during the first half of the time period that the appropriate *x*, *k* and *l* signals are present, data is clocked into the data flip flop 250, which also receives the clock pulse from the clock phase select 254, with CP 1 and during the second half of the appropriate *x*, *k* and *l* signal time period the data is clocked in at CP 2. Such an arrangement has been found to be necessary where the phase relationship and polarity of the received data signal is unknown with respect to the interrogator timing system. It will be appreciated that if appropriate timing synchronization or self clocking communication techniques are incorporated this particular arrangement need not be utilized. This concludes the description of a preferred embodiment of the present invention. From the above it will be appreciated that there has been described a complete interrogator responder system wherein a passive responder tag may be utilized with an appropriate interrogator to detect the particular digital code contained in the responder tag. While the above embodiment describes the utilization of the present invention in a three dimensional detection mode, it will be appreciated that a substantially flat plane type of interrogator may be utilized in which only two power field generation coils are utilized wherein the power field is projected toward the responder tag instead of requiring the responder tag to be physically passing through the coil arrangement. Such an embodiment provides acceptable two dimensional detection capability and, due to the flux interchange, approximately 15° to 20° of three dimensional detection capability also. Thus such a unit would be designed to be situated along side of the appropriate responder tag or structure housing the responder tag. In a portable configuration the unit would be appropriately moved around to detect the presence of the responder tag. Thus manually three dimensions can be covered with the two coil two dimensional arrangement. FIGS. 9 and 10 illustrate one such embodiment of an interrogator, generally designated 400 useful for a primarily two dimensional signal transmission and signal detection application. As shown in FIGS. 9 and 10, the arrangement 400 may be considered a portable handheld unit which is provided with a handle 402 for appropriate carrying and positioning. An electronic section 404 houses the appropriate electronics similar to that described above for the interrogator 12 except that, for example, in this embodiment there may be a self-contained source of electrical energy such as a battery (not shown) within the electronic section 404. Alternately, the electronics section 404 may be housed in a separately carried or mounted structure. A coil section 408 is provided and houses within it a pair of orthogonal power generation coils and a receiving coil. The arrangement of the coils is shown in FIG. 10. One of the coils 410 is wound in a manner to have the long portions of the coil parallel to the top surface 412 and bottom surface 414 of the coil portion 408, with the axis of the coil 410 in the Y direction.

A second coil 411 is wound in a manner similar to the first coil 410 except with the axis of the coil 411 in the X direction.

A third coil 416 is wound to have its long portion parallel to and adjacent the first side 418 and second side 420 of the coil portion 408 and with the axis of the coil 416 in the Z direction. An appropriate on-off switch 422 may be provided. In this embodiment of the invention, the first coil 410 and second coil 411 may be a continuously operated power field generation coil, when the on-off switch 420 is in the on position for generating the power field for the responder tag such as the responder tag 22 described above.

Alternately, the first coil 410 and the second coil 411 may be sequentially switched to generate a power field in the X axis with the first coil 410 followed in time by a power field in the Y axis with the second coil 411 in a manner similar to the three dimensional power field generator described above.

The third coil 416, then is a continuously receiving coil and there is no sequencing operation provided. The bottom surface 414 may be positioned by the person holding the handle 412 approximately parallel to the surface wherein the responder tag 22 is positioned in order to receive the coded information field coupled therefrom upon receipt of the power field generated by the first coil 410 or the second coil 411. Validation and capture logic similar to the validation and capture logic 39 described above may also be utilized in this embodiment, together with appropriate display and/or visual and/or audio responses.

In yet another embodiment of the invention, the interrogator 400 may comprise only a single power field coil 410 or 411 and a single receiving coil 416. Such an embodiment provides acceptable one dimensional detection capability and a limited two and three dimensional capability also.

In yet another embodiment of the invention, the interrogator power signal generator, electromagnetic power field generator and the responder electromagnetic power field receiver may be replaced by an active power source electrically connected to the responder tag. The active power source may comprise a battery located within the item, such as a vehicle, to which the responder tag is affixed or may comprise a small battery physically located within the responder tag. Such an embodiment is useful in applications where it is desirable to minimize the complexity of the interrogator and where an active power source is available to provide power to the responder. In this embodiment the interrogator 12 comprises only the power supply 14, time-base generator 16, electromagnetic coded information field receiver 34, coded information signal detection 36 and information capture and validation logic 38. Any of the previously discussed techniques for receiving and processing the electromagnetic coded information field are applicable to this embodiment.

Those skilled in the art may find many variations and adaptations of the interrogator responder tag arrangement described above. It will be appreciated that all such variations and adaptations falling within the scope and spirit of the present invention are intended to be covered by the appended claims.

We claim:

1. An interrogator-responder system for providing an output signal having an information content corresponding to an uniquely coded information field of a particular responder, and generated in said responder, in response to the interrogator, and comprising, in combination:

an interrogator means for establishing an electromagnetic AC power field and receiving an electromagnetic coded information field, and generating the output signal in response thereto;

a responder tag means positionable in AC power field and coded information field energy exchange relationship to said interrogator means for receiving said AC power field and generating the uniquely coded information field in response thereto;

said interrogator means comprising:

a power supply means for providing a controlled source of electric energy;

a power signal generator means for receiving said controlled electric energy and generating a power signal in response thereto;

a power field generator means for receiving said power signal and generating said AC power field having a first preselected frequency for inductive coupling into said responder tag means;

a coded information field receiver means for receiving said uniquely coded information field from said responder tag means and said uniquely coded information field having a second preselected frequency different from said first preselected frequency;

coded information field detection means powered by said controlled source of electric energy, for detecting the existance of said coded information field in said coded information field receiver means and generating a detected coded signal in response thereto;

information capture and validation logic means, powered by said controlled electric energy, for receiving said detected coded signal from said coded information field detection means and generating an output signal having an information content corresponding to said uniquely coded information field in response thereto;

time-base signal generating means for generating a time-base signal and providing said time-base signal to said power signal generator and to said logic means for synchronization;

said responder tag means is free of active power supplies and comprises:

power field receiver means for receiving said AC power field from said power field generator of said interrogator means and providing DC tag power signals in response thereto;

carrier time-base signal generator means for receiving said DC tag power signal and generating a carrier time-base signal at said second preselected frequency in response thereto;

a code signal generator powered by said DC tag power signal for repetitively generating a unique code signal at a third frequency different from said second frequency in response to said DC tag power input thereto;

coded information signal generator means powered by said DC tag power signal for receiving said carrier time-base signal at said second frequency and receiving said unique code signal at said third frequency and modulating said carrier time-base signal with said unique code signal to generate a coded information signal unique to said responder tag;

coded information field generator for receiving said coded information signal and generating said coded information field for said inductive coupling into said coded information field receiver of said interrogator means.

2. The arrangement defined in claim 1 wherein said code signal generator further comprises:

binary signal generating means for generating an unique digital binary code signal having a plurality of information bits and a first portion of said plurality of information bits comprises a common binary bit sequence for synchronizing said coded information signal, and a second portion of said plurality of information bits comprises an unique binary bit sequence; said logic means of said interrogator means further comprises:

sequence detection means for detecting said common binary bit sequence in said detected coded signal of said coded information signal detector and generating said output signal in response to said unique binary bit sequence in said coded information field.

3. The arrangement defined in claim 2 wherein said interrogator is inductively coupled to said responder tag means for providing said AC power field to said responder tag means and receiving said coded information field from said responder tag means, and said power field generator and said coded information field receiver of said interrogator means together comprise:

a plurality of interrogator coils oriented in a preselected geometric array and each of said coils is sequentially operable in a plurality of conditions, a first of said conditions comprising a field generating condition for generating said AC power field and a second of said conditions comprising a coded information field receiving condition for receiving said coded information field (1) from said responder tag means;

said interrogator means further comprising:

switching means coupled to said plurality of interrogator coils for sequentially switching each of said plurality of interrogator coils from each of said plurality of conditions to another of said plurality of conditions at a predetermined switching frequency and in a preselected sequential order; said coded information signal generator of said responder tag means further comprises:

a responder tag coil means;

said power field receiver of said responder tag means further comprises:

a coil means for inductively coupling said AC power field into said responder tag;

DC voltage magnitude limiting means for limiting the magnitude of said DC tag power signals generated by said power field receiver means in response to said AC power input field.

4. The arrangement defined in claim 3 wherein: said plurality of interrogator coils comprises three coils and said preselected geometric array comprises a orthogonal array of said coils, and said switching means further comprises means for at least switching each of said coils from said first condition to said second condition and from said second condition to said first condition in a predetermined order to provide two of said three coils simultaneously in said first condition and one coil in said second condition whereby said interrogator detects said coded information signal for said responder tag in any geometric orientation with respect to said interrogator coils of said interrogator means.

5. The arrangement defined in claim 4 wherein: said responder tag is positionable in regions adjacent the intersection of the axis of said mutually orthogonal interrogator coils.

6. The arrangement defined in claim 5 wherein: said first preselected frequency and said third preselected frequency are each on the order of 50 kiloHertz, and said second preselected frequency is on the order of 450 kiloHertz.

7. The arrangement defined in claim 4 wherein:

said coded information signal generating means of said responder tag means further comprises:

means for amplitude modulating said carrier time-base signal with said code signal.

8. The arrangement defined in claim 4 wherein: said coded information signal generating means of said responder tag means further comprises:

means for phase modulating said carrier time-base signal with said code signal.

9. The arrangement defined in claim 4 wherein: said coded information signal generating means of said responder tag means further comprises:

means for frequency modulating said carrier time-base signal with said code signal.

10. The arrangement defined in claim 2 wherein:

said interrogator means is inductively coupled to said responder tag means for providing said AC power input field to said responder tag means and for receiving said coded information field from said responder tag means;

said power field generator of said interrogator means comprises:

a pair of elongated interrogator coils, each of said pair of elongated interrogator coils having a long axis and a short axis and geometrically arranged to have said long axis perpendicular to each other for simultaneously generating said AC power field; said coded information field receiver of said interrogator means comprises:

a receiving coil positioned in close proximity to said pair of interrogator coils;

said coded information field generator of said responder tag means further comprises:

a responder tag coil means; said power field receiver of said responder tag means further comprises:

a coil means for inductively coupling said power field into said responder tag;

DC voltage limiting means for limiting the magnitude of said DC tag power signal generated by said loop-stick means in response to said AC power field.

11. The arrangement defined in claim 10 wherein:

said interrogator coils and said receiver coil are enclosed in a field transmitting case means.

12. The arrangement defined in claim 11 wherein:
said first preselected frequency and said third preselected frequency are on the order of 50 kiloHertz and said second preselected frequency is on the order of 450 kiloHertz.

13. The arrangement defined in claim 10 wherein:
said coded information signal generating means of said responder tag means further comprises:
means for amplitude modulating said carrier time-base signal with said code signal.

14. The arrangement defined in claim 10 wherein:
said coded information signal generating means of said responder tag means further comprises:
means for phase modulating said carrier time-base signal with said code signal.

15. The arrangement defined in claim 10 wherein:
said coded information signal generating means of said responder tag means further comprises:
means for frequency modulating said carrier time-base signal with said code signal.

16. The arrangement defined in claim 2 wherein:
said power field generator means and said coded information field receiver means together comprise a plurality of three mutually orthogonal coils for inductive coupling between said responder tag and said interrogator means, and said mutually orthogonal coils are sequentially operated in a power transmit condition, a signal receiving condition and a null condition in a preselected sequence.

17. The arrangement defined in claim 2 wherein:
said power field generator means and said coded information field receiver means comprise:
a pair of mutually orthogonal coils, a first of said pair of coils comprising said power field generator means; and
a second of said pair of coils comprises a coded information field receiver for receiving a coded information field from said responder tag.

18. The arrangement defined in claim 2 wherein:
said interrogator means further comprises means for pulsing said power field provided to said responder tag.

19. The arrangement defined in claim 2 and further comprising:
clock generator means for generating a clock signal having a predetermined frequency substantially twice the frequency of said AC power field provided to said responder tag.

20. The arrangement defined in claim 19 wherein:
said coded information signal detection means further comprises:
a notch filter for receiving said coded information signal from said coded information field receiver means and filtering said coded information signal to remove components of interrogator power cross coupled therein from said power signal transmitter;
an amplifier-demodulator stage for receiving the output from said notch filter means for amplifying the signal received from the notch filter and demodulating said amplified signal;
an amplifier means for further amplifying said amplified-demodulated signal; and
a logic buffer means for receiving the amplified-modulated signal and converting same to said detected coded signal having a predetermined voltage and a predetermined current.

21. The arrangement defined in claim 20 wherein:
said logic means further comprises a validation and capture portion for validating the true information content of said detected coded signal applied thereto from said coded information signal detection means and providing display thereof on a preselected display means for the condition of said information signal validated.

22. The arrangement defined in claim 21 wherein:
said logic means further comprises:
a digital counter having a predetermined plurality of stages, a first portion of said stages for generating control signals, and a second portion of said stages for generating opposite phased signals, and said opposite phased signals applied to said validation and capture portion;
said control signals for providing sequencing control to said power signal transmitter means and said coded information signal receiver means for sequencing in a predetermined sequence, and for pulsing said power signal generator to provide a pulsed power field to said responder tag.

23. A passive responder tag means comprising, in combination:
a power field receiver means for receiving an AC power field inductively coupled thereto and providing DC tag power signals in response thereto;
carrier time-base signal generating means for receiving said DC tag power signal and generating an AC carrier time-base signal at a first predetermined frequency in response thereto;
a code signal generator powered by said DC tag power signal for repetitively generating an unique code signal at a second frequency different from said first frequency in response to said DC tag power signal input thereto;
coded information signal generating means powered by said DC tag power signal for receiving said carrier time-base signal at said first frequency and for receiving said unique code signal at said second frequency and for modulating said carrier time-base signal with said unique code signal to generate a coded information signal unique to said tag responder;
coded information field generating means for receiving said coded information signal and generating an electromagnetic coded information field in regions external of said responder tag means.

24. The arrangement defined in claim 23 wherein:
said code signal generator means further comprises binary signal generating means for generating an unique binary code signal having a plurality of information bits and a first portion of said plurality of information bits comprises a common binary bit sequence for keying said coded information signal, and a second portion of said plurality of binary information bits comprises an unique binary bit sequence;
said coded information field generator means further comprises:
a responder tag coil means;

said power field receiver means further comprises:

a coil means for inductively coupling said AC power field into said responder tag means; and DC voltage limiting means for limiting the magnitude of said DC tag power signals.

25. The arrangement defined in claim 24 wherein:

said coil means comprises four diode bridge means for converting said AC power input signal to said DC tag power signals and said DC voltage limiting means comprises a zener diode.

26. The arrangement defined in claim 25 wherein:

said coded information signal generating means further comprises amplitude modulation means for amplitude modulating said carrier time-base signal with said code signal.

27. The arrangement defined in claim 24 wherein:

said coded information signal generating means further comprises phase modulation means for phase modulating said carrier time-base signal with said code signal.

28. The arrangement defined in claim 24 wherein:

said coded information signal generating means further comprises frequency modulation means for frequency modulating said carrier time-base signal with said code signal.

29. The arrangement defined in claim 24 wherein:

said binary signal generating means further comprises a binary code generator, and said common binary bit sequence in said binary code signal is represented by an eight bit binary notation P1111110; and said first preselected frequency of said carrier time-base signal is on the order of 450 kiloHertz and said second preselected frequency of said code signal is on the order of 50 kiloHertz.

30. The arrangement defined in claim 25 wherein:

said binary code generator comprises a metal oxide multiplexor.

31. The arrangement defined in claim 25 wherein:

said binary code generator comprises a complimentary metal oxide multiplexor.

32. The arrangement defined in claim 25 wherein:

said binary code generator comprises a silicon on sapphire multiplexor.

33. An interrogator-responder system for providing an output signal having an information content corresponding to an uniquely coded information field indicative of a particular responder and generated therein in response to the interrogator and comprising, in combination:

an interrogator means for establishing an electromagnetic AC power field and receiving an electromagnetic coded information field, and generating the output signal in response thereto;

a responder tag means positioned in AC power field and coded information field energy exchange relationship to said interrogator means;

said responder tag means is free of active power supplies and comprises:

power field receiver means for receiving said AC power field from said interrogator means and providing DC tag power signals in response thereto;

carrier time-base signal generator means for receiving said DC tag power signal and generating a carrier time-base signal at a second preselected frequency in response thereto;

a code signal generator powered by said DC tag power signal for repetitively generating a unique code signal at a third frequency in response to said DC tag power input thereto;

coded information signal generator means powered by said DC tag power signal for receiving said carrier time-base signal at said second frequency and receiving said unique code signal at said third frequency and modulating said carrier time-base signal with said unique code signal to generate a coded information signal unique to said responder tag;

coded information field generator for receiving said coded information signal and generating said coded information field for said inductive coupling into said coded information field receiver of said interrogator means.

34. An interrogator-responder system for providing an output signal having an information content corresponding to an uniquely coded information field indicative of a particular responder and generator therein in response to the interrogator and comprising, in combination:

an interrogator means for establishing an AC electromagnetic power field and receiving an electromagnetic coded information field, and generating the output signal in response thereto;

a responder tag means positionable in power field and coded information field energy exchange relationship to said interrogator means for receiving said AC power field and generating said uniquely coded information field in response thereto;

said interrogator means comprising:

a power supply means for providing a controlled source of electric energy;

a power signal generator means for receiving said controlled electric energy and generating a power signal in response thereto;

a power field generator means for receiving said power signal and generating said AC power field having a first preselected frequency for inductive coupling into said responder tag means;

a coded information field receiver means for receiving the uniquely coded information field from said responder tag means and the uniquely coded information field having a second preselected frequency different from said first preselected frequency;

coded information detection means powered by said controlled source of electric energy for detecting the existence of said coded information field in said coded information field receiver means and generating a detected coded signal in response thereto;

information capture and logic means, powered by said controlled electric energy, for receiving said detected coded signal from said coded information field detection means and generating an output signal having an information content corresponding to said uniquely coded information field in response thereto; and time base signal generating means for generating a time base signal and providing said time base signal to said power signal generator and to said logic means for synchronization.

35. An interrogator means for establishing an AC electromagnetic power field and receiving and identifying an electromagnetic coded information field transmitter thereto, and generating an output signal in response to said identified electromagnetic coded information field, and comprising:

a power supply means for providing a controlled source of electric energy;

a power signal generator means for receiving said controlled electric energy and generating a power signal in response thereto;

a power generator means for receiving said power signal and generating the AC power field having a first preselected frequency for transmitting said AC power field to regions remote the interrogator;

a coded information field receiver means for receiving a coded information field from regions esternal to the interrogator and said coded information field having a second preselected frequency different from said first preselected frequency;

coded information field detection means powered by said controlled source of electric energy for detecting the existence of said coded information field in said coded information field receiver means and generating a detected coded signal in response thereto;

information capture and validation logic means powered by said controlled source of electric energy for receiving said detected coded signal from said coded information field detection means and generating an output signal having an information content corresponding to said uniquely coded information field in response thereto; and time base signal generating means for generating time base signal and providing said time base signal to said power signal generator and to said information capture and validation logic means for synchronization.

36. The arrangement defined in claim 35 wherein said power field generator and said coded information field receiver together comprise:

a plurality of interrogator coils oriented in a preselected geometric array and each of said coils is sequentially operable in a plurality of conditions, a first of said conditions comprising a power field generating condition for generating said power field and transmitting said power field to regions remote the interrogator and the second of said conditions comprising a coded information field receiving condition for receiving said uniquely coded information field from regions external the interrogator;

and said interrogator means further comprising:

switching means coupled to said plurality of interrogator coils for sequentially switching each of said plurality of interrogator coils from each of said plurality of conditions to another of said plurality of conditions at a predetermined switching frequency and in a preselected sequential order.

37. The arrangement defined in claim 36 wherein:

said plurality of interrogator coils comprises three coils and said preselected geometric array comprises an orthogonal array of said coils, and said switching means further comprises means for at least switching each of said coils from said first condition to said second condition and from said second condition to said first condition in a predetermined order to provide two of said three coils simultaneously in said first condition and one coil in said second condition whereby said interrogator detects said coded information signal for said responder tag in any geometric orientation with respect to said interrogator coils of said interrogator means.

38. The arrangement defined in claim 36 wherein: said first preselected frequency is on the order of 50 kH and said second preselected frequency is on the order of 450 kH.

39. The arrangement defined in claim 36 wherein said validation and logic means of said interrogator further comprises:

sequence detection means for detecting a unique binary bit sequence in the detected coded signal of said coded information signal detector and generating said output signal in response to said unique binary bit sequence in said coded information field.

40. The arrangement defined in claim 36 wherein: said power field generator of said interrogator means comprises:

a pair of elongated interrogator coils, each of said pair of elongated interrogator coils having a long axis and a short axis and geometrically arranged to have said long axis perpendicular to each other for simultaneously generating said AC power field;

said coded information field receiver of said interrogator means comprises:

a receiver coil positioned in close proximity to said pair of interrogator coils.

* * * * *